(12) United States Patent
Takenaka et al.

(10) Patent No.: US 6,254,513 B1
(45) Date of Patent: Jul. 3, 2001

(54) PEDOMETER

(75) Inventors: Masaaki Takenaka; Tsutomu Yamasawa; Tomoo Watanabe; Shinya Tanaka; Toshio Otani, all of Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 09/398,114

(22) PCT Filed: Sep. 11, 1996

(86) PCT No.: PCT/JP96/02586

§ 371 Date: Apr. 26, 1996

§ 102(e) Date: Apr. 26, 1996

(87) PCT Pub. No.: WO97/10567

PCT Pub. Date: Mar. 20, 1997

Related U.S. Application Data

(62) Division of application No. 08/836,317, filed on May 12, 1997.

(30) Foreign Application Priority Data

| Sep. 12, 1995 | (JP) | 7-233700 |
| Dec. 15, 1995 | (JP) | 7-326916 |
| Apr. 26, 1996 | (JP) | 8-130999 |

(51) Int. Cl.$^7$ .................................................. G02M 19/00
(52) U.S. Cl. ................................. 482/3; 482/74; 235/105
(58) Field of Search ............ 482/1–9, 51, 900–902, 482/74; 73/172, 488–490, 379.01; 235/105

(56) References Cited

U.S. PATENT DOCUMENTS

| 5,202,559 | 4/1993 | Durst . |
| 5,278,414 | 1/1994 | Samuelson et al. . |
| 5,373,153 | 12/1994 | Cumberledge et al. . |
| 5,446,775 | * 8/1995 | Wright et al. ........................ 377/24.2 |
| 5,485,402 | * 1/1996 | Smith et al. ........................... 702/160 |
| 5,510,893 | 4/1996 | Suzuki . |
| 5,526,290 | * 6/1996 | Kanzaki .................................... 482/3 |
| 5,720,200 | * 2/1998 | Anderson et al. ...................... 73/172 |
| 5,724,265 | * 3/1998 | Hutchings ............................. 702/141 |
| 5,955,667 | * 9/1999 | Fyfe ........................................ 73/490 |

FOREIGN PATENT DOCUMENTS

| 59-3306 | 6/1982 | (JP) . |
| 64-43713 | 2/1989 | (JP) . |
| 1-100418 | 4/1989 | (JP) . |
| 1-287417 | 11/1989 | (JP) . |
| 2-161932 | 7/1990 | (JP) . |
| 4-36414 | 7/1990 | (JP) . |
| 3-183961 | 8/1991 | (JP) . |
| WO97/10567 | 3/1997 | (WO) . |

OTHER PUBLICATIONS

Patent Abstracts of Japan; Publication No. 01043713A; date of publication: Feb. 16, 1989.
Patent Abstracts of Japan; Publication No. 03183961A; date of publication: Aug. 9, 1981.
Patent Abstracts of Japan; Publication No. 01100418A; date of publication: Apr. 18, 1989.
Patent Abstracts of Japan; Publication No. 02161932A; date of publication: Jun. 21, 1990.

* cited by examiner

*Primary Examiner*—Glenn E. Richman
(74) *Attorney, Agent, or Firm*—Rosenthal & Osha, L.L.P.

(57) ABSTRACT

A pedometer includes a main body 1, two acceleration sensors 3 and 4 supported in an oscillating manner in a horizontal direction and a vertical direction at a substrate 2 within the main body 1, an angle detection sensor 5 for detecting an angle of inclination of main body 1 to the ground, and a pace counter for selecting output of either acceleration sensor 3 or 4 according to an output of angle detection sensor 5 for counting the number of paces thereby.

14 Claims, 21 Drawing Sheets

ANGLE 35 DEGREES

ANGLE 40 DEGREES

ANGLE 45 DEGREES

ANGLE 50 DEGREES

PEDOMETER

CROSS-REFERENCE TO RELATED APPLICATIONS

This application is a division of application Ser. No. 08/836,317, filed on May 12, 1997, which is a 371 of PCT/JP96/02586, filed Sep. 11, 1996.

TECHNICAL FIELD

The present invention relates to a pedometer that counts the number of paces according to the motion of the body during walking and running, and particularly to a pedometer that can accurately detect the number of paces and the like independent of the angle of the main body.

BACKGROUND ART

A pedometer generally includes a main body, an acceleration sensor provided in the main body for detecting a pace signal according to motion of the body, and a pace counter for counting the number of paces according to an output of the acceleration sensor. The number of paces is counted from the (up and down) movement of the body during walking (or running).

In detecting the up and down motion, the upward movement and the downward movement respectively vary greatly depending upon the state of the walking site, the shoes worn, the manner of walking, and the like. Therefore, there is a problem that the number of paces cannot be counted accurately in a conventional pedometer that counts the number of paces by detecting only the output corresponding to either the upward movement or the downward movement.

In order to solve this problem, the "pedometer" described in Japanese Patent Laying-Open No. 2-161932 (referred to as first prior art hereinafter), for example, includes an upper detector and a lower detector for detecting the upward acceleration and downward acceleration, respectively, and a select unit for selecting which of the pace signals from the upper or lower detector is to be the object of counting. It is aimed to count the number of paces accurately independent of the walking site, the shoes, and the manner of walking.

The pedometer described in Japanese Patent Laying-Open No. 1-287417 (referred to as second prior art hereinafter) employs a piezo-electric element formed in a cantilever structure as a sensor. A weight is provided at the free end of this sensor. An acceleration sensor having the fixed end supported via a shock elimination member is employed.

However, all the conventional pedometers including the one described in the first prior art has the main body of the pedometer in which an acceleration sensor is incorporated attached to the belt and the like of the pants or skirt to count the number of paces. There was a problem that the main body cannot be attached to one dressed without any belt and the like so that the number of paces cannot be counted. In the case where the main body is attached to the belt, the pedometer is noticeable since it has a size and thickness of some level. Others can easily perceive that the wearer is counting his/her number of paces. Even if the pedometer is covered by the clothing, the portion of the pedometer will bulge out to degrade the appearance. There was a problem that the style is spoiled.

The pedometer described in the above second prior art must have the weight and the piezo-electric element mounted in a weight case. There was a problem that assembly thereof is difficult, and the working cost increased. Furthermore, in the case where detection in a plurality of directions of virtual axes is required, the same acceleration sensor must be arranged individually at each direction of axis. There was a problem that the cost is increased.

The present invention is directed to these problems, and has an object of providing a pedometer that can count the number of paces without having to be attached to the belt, and that can easily be assembled and reduced in cost.

Another object of the present invention is to provide a pedometer that can accurately detect the number of paces and the like independent of the orientation of the main body.

A further object of the present invention is to provide an angle detection sensor of high accuracy with a broad application, and an angle detection device including such an angle detection sensor.

DISCLOSURE OF THE INVENTION

The pedometer of the present invention includes a plurality of sensors arranged in the main body so as to differ from each other in the attached direction for providing an output signal according to vertical fluctuation components, an angle detector provided within the main body for detecting orientation of the main body, a selector for selecting one of the output signals from the plurality of sensors according to the detection signal of the angle detector, and a pace counter for counting the number of paces from the output signal of the sensor selected according to the selection of the selector.

One of the plurality of sensors provided in the main body so as to differ in its attached direction is selected according to the orientation of the main body. Since the number of paces is counted according to the output of the selected sensor, the fluctuation component in a constant direction can be reliably detected. As a result, a pedometer is provided that can count the number of paces without having to be attached to the belt, and that can easily be assembled and reduced in cost.

According to another aspect of the present invention, a pedometer includes a sensor provided in the main body for providing an electric signal according to the vertical fluctuation components, and a pace counter for counting the number of paces according to the output signal of the sensor. The sensor provides an output signal independent of the orientation of the main body.

Since the sensor provided in the pedometer outputs an electric signal according to the vertical fluctuation components independent of the orientation of the main body, fluctuation in the vertical direction can be detected reliably irrespective of the attached direction of the main body by using the output of the sensor. As a result, a pedometer that can precisely detect the number of paces and the like independent of the orientation of the main body can be provided.

According to still another aspect of the present invention, an angle detection sensor includes a main body of the angle detection sensor, a mobile unit provided movably within a range of motion including a predetermined region in the angle detection sensor main body, and a presence detector for detecting presence of the mobile unit in a predetermined region within the motion range. In the angle detection sensor, the motion range is a cavity enclosed by walls. The presence detector is an optical sensor including a light emitting element and a photodetector. The photodetector is arranged opposite the light emitting element with the cavity therebetween to detect whether there is a mobile unit on the optical axis of the optical sensor which is the predetermined region.

The state of motion of the mobile unit in the motion range varies according to the inclination of the angle detection sensor main body. The information of whether or not there is a mobile unit at the predetermined region in the motion range governed by the varying state of motion is obtained as a detection signal of mobile unit present/absent. The frequency or time of occurrence of the detection signal is extracted and compared with the frequency or time of occurrence corresponding to a predetermined angle to detect the angle. As a result, an angle detection sensor that can reliably detect the inclination angle can be provided.

BEST MODE FOR PRACTICING THE INVENTION

Embodiments of the present invention will be described hereinafter with reference to the drawings.

(1) First Embodiment

Figure 1:
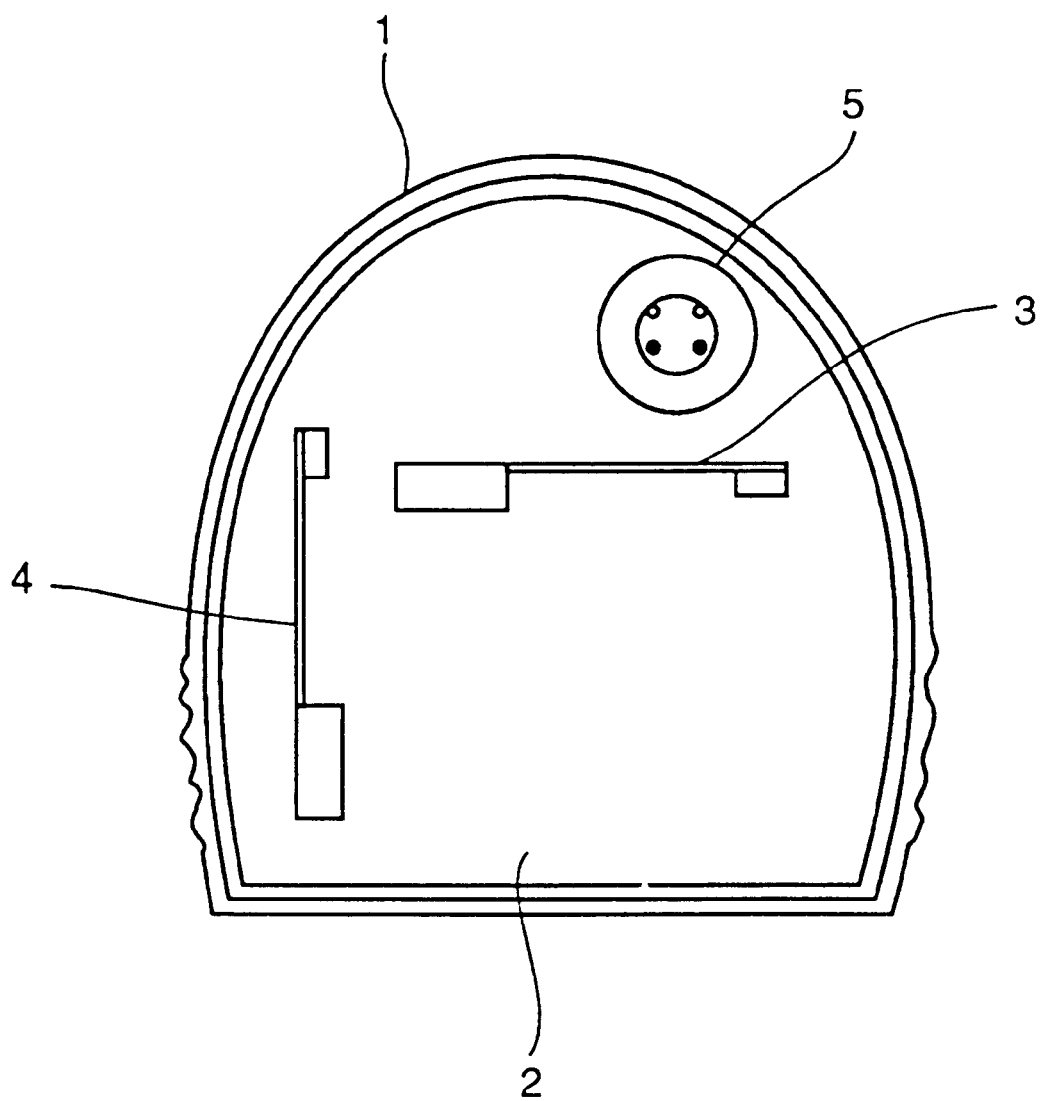
FIG. 1 is a diagram showing an internal structure of the main body of a pedometer according to a first embodiment of the present invention.

Referring to FIG. 1, a substrate 2 of a configuration as illustrated is arranged in a main body 1 of a pedometer. Two acceleration sensors 3 and 4 and an angle detection sensor 5 are mounted on substrate 2. In the present embodiment, acceleration sensors 3 and 4 are both of the cantilever type, supported in an oscillatory manner. The sensors are arranged in the direction of two virtual axes perpendicular to each other (the horizontal direction and the vertical direction). Acceleration sensor 3 is provided in the horizontal direction, and acceleration sensor 4 is provided in the vertical direction.

Figure 2:
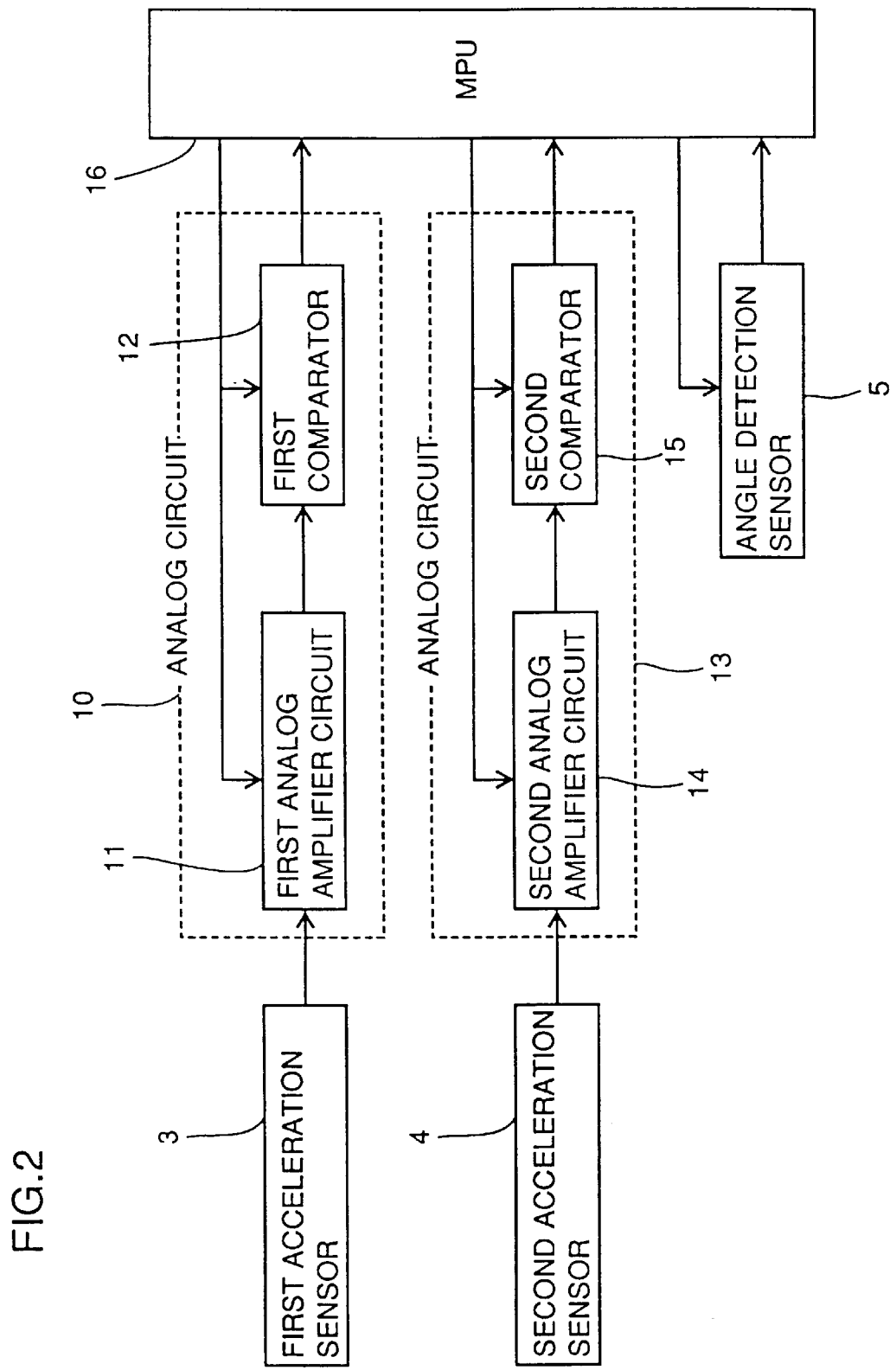
FIG. 2 is a block diagram showing a structure of a pedometer according to the first embodiment.

The structural block of this pedometer is shown in FIG. 2. An output signal of first acceleration sensor 3 is amplified by a first analog amplifier circuit 11 in an analog circuit 10 to be applied to an MPU 16 via a first comparator 12. Similarly, an output signal of second acceleration sensor 4 is amplified by a second analog amplifier circuit 14 in an analog circuit 13 to be applied to MPU 16 via a second comparator 15. The output signal of angle detection sensor 5 is directly applied to MPU 16. It is appreciated from this block diagram that the output signals of acceleration sensors 3 and 4 are entered into MPU 16 via exclusive analog circuits 10 and 13, respectively.

Although the two acceleration sensors 3 and 4 are respectively arranged in the horizontal direction and the vertical direction in the first embodiment, a plurality of acceleration sensors may be provided in the corresponding plurality of directions of the virtual axis at equal angular interval from the center point. For example, three acceleration sensors may be provided at the angular interval of 120 degrees from the center point.

(2) Second Embodiment

Figure 3A:
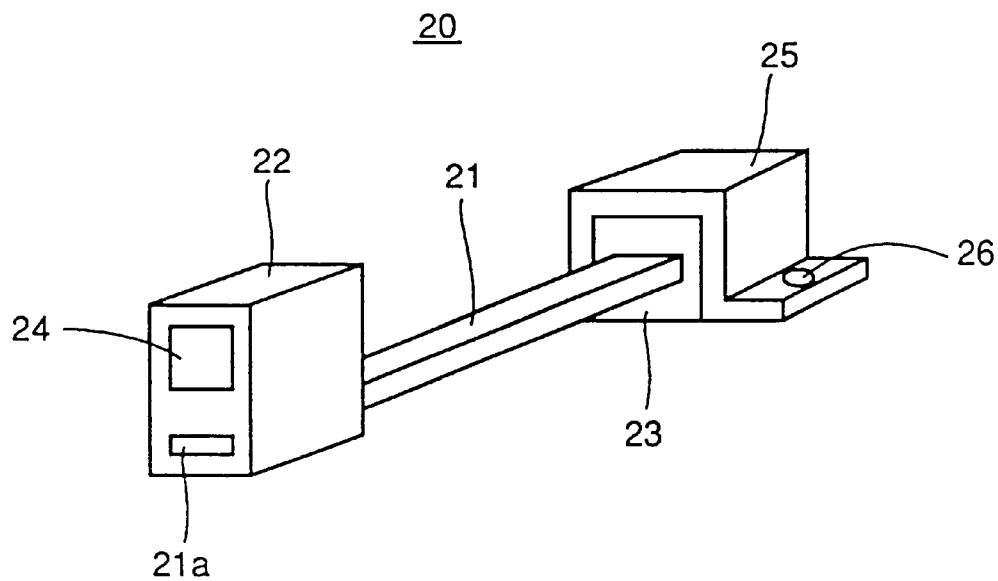
FIGS. 3a and 3b are a perspective view and a side view, respectively, of the appearance of an acceleration sensor in a pedometer according to a second embodiment.
Figure 3B:
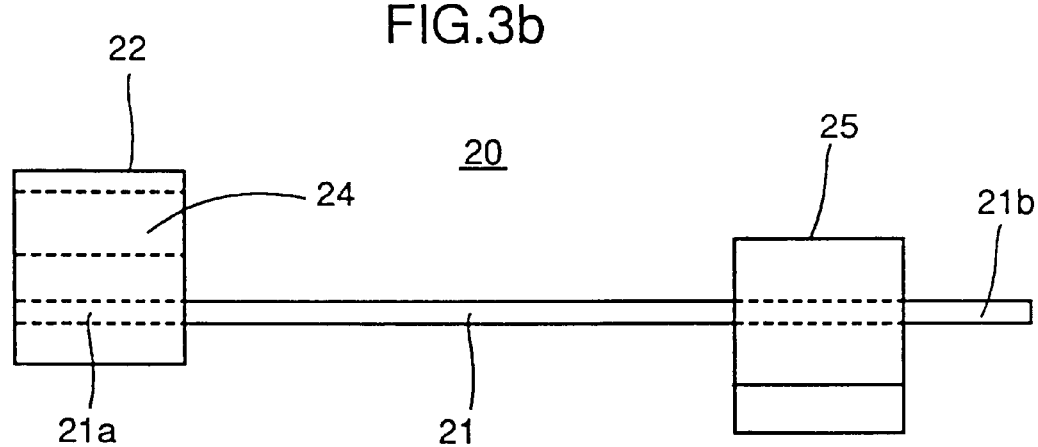
Figure 4:
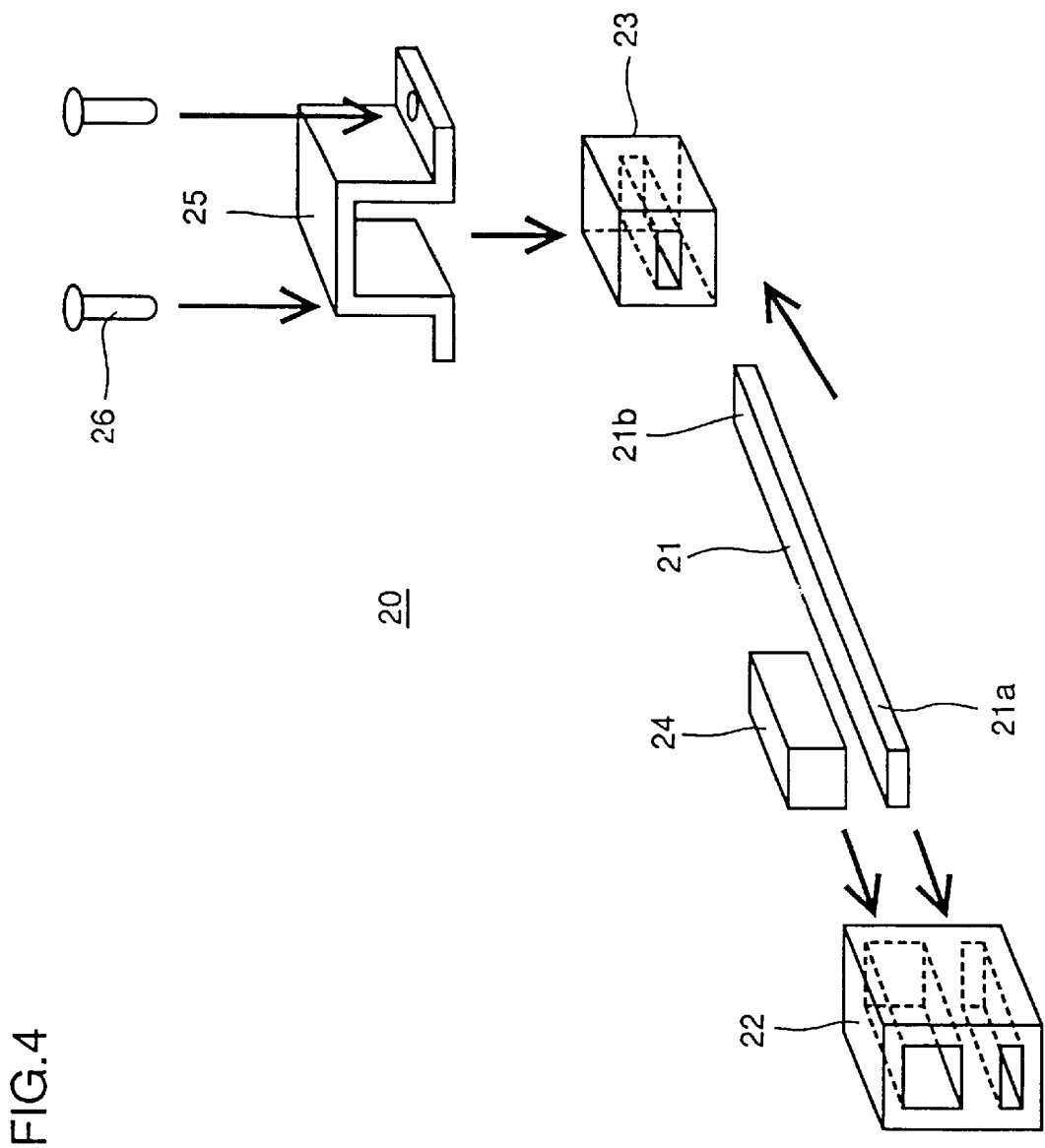
FIG. 4 is an exploded perspective view of the acceleration sensor of FIG. 3.

The second embodiment will be described with reference to FIGS. 3a, 3b, and 4. In this acceleration sensor 20, a weight case 22 is attached at one end 21a of a piezo-electric element 21. A support member 23 is attached at the other end 21b side. Weight 24 and the one end 21a side of piezo-electric element 21 are press-fitted into weight case 22. The side of the other end 21b of piezo-electric element 21 is press-fitted in support member 23. Support member 23 is press-fitted into fixed unit 25, which is fixed at an appropriate position to the main body of the pedometer by a screw 26.

Figure 5:
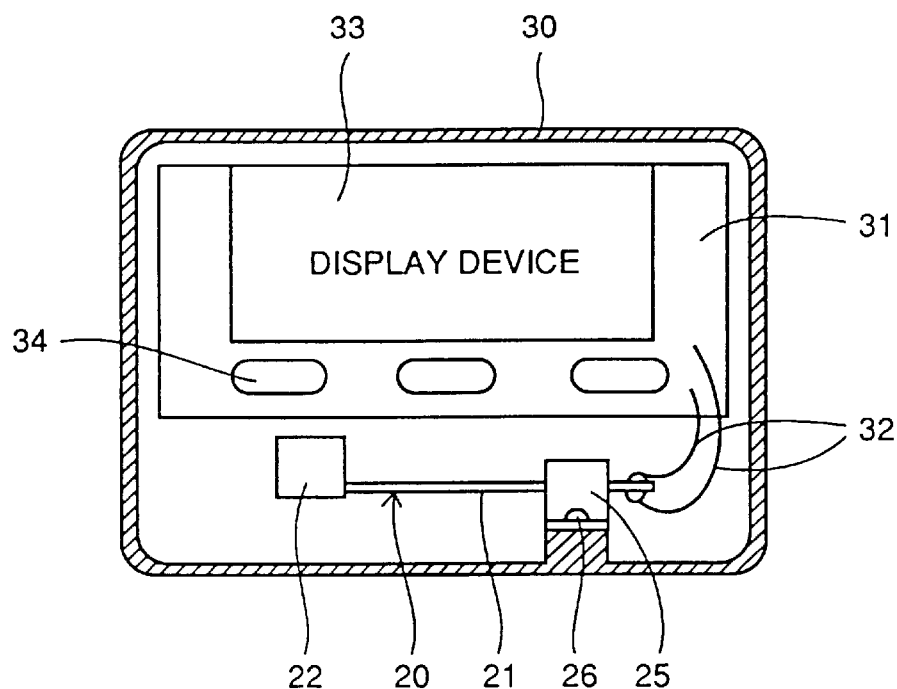
FIG. 5 is a diagram showing the acceleration sensor of FIG. 3 incorporated into the main body of the pedometer.

Such an acceleration sensor 20 is incorporated into a pedometer as shown in FIG. 5, for example. In this case, acceleration sensor 20 is fixed by fixed unit 25 in main body case 30 of the pedometer so that piezo-electric element 21 is arranged horizontally. Piezo-electric element 21 is connected to substrate 31 by a lead wire 32. A display unit 33 and a switch 34 are provided at substrate 31.

In the case where a pedometer includes a plurality of acceleration sensors, the acceleration sensors are disposed respectively in the plurality of virtual axis directions at equiangular interval from the center point. Particularly, in the case where two acceleration sensors are employed, the acceleration sensors are respectively disposed at the two virtual axis directions perpendicular to each other (in the horizontal direction and the vertical direction). In this case, the two acceleration sensors preferably have the structure as shown in FIG. 6.

Figure 6:
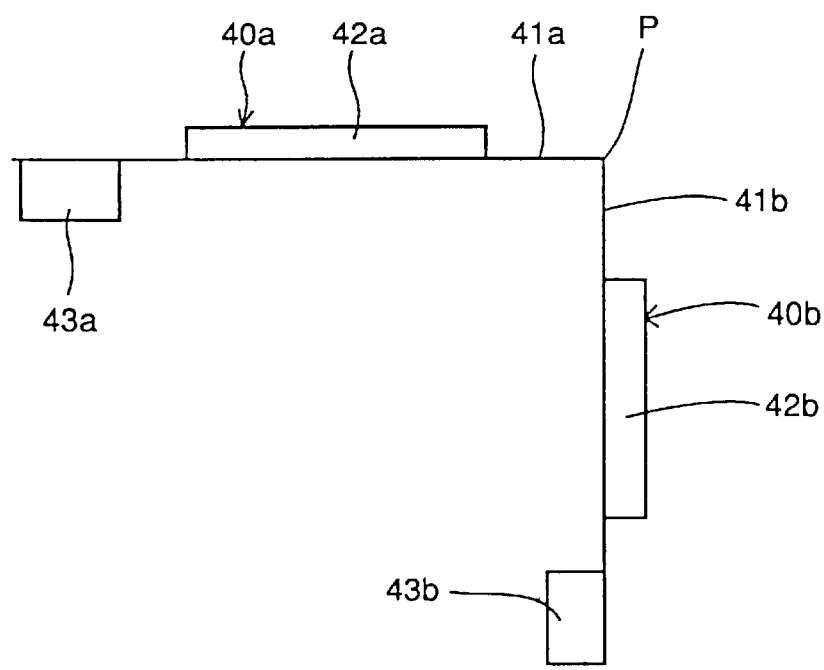
FIG. 6 shows an acceleration sensor formed by integrating two acceleration sensors.

Referring to FIG. 6, two acceleration sensors 40a and 40b are formed integrally and disposed in the horizontal direction and the vertical direction, respectively. More specifically, acceleration sensors 40a and 40b include elastic plates 41a and 41b extending from an integrated supporting point P as the fixed one side end in the horizontal direction and the vertical direction, respectively, piezo-electric elements 42a and 42b attached to elastic plates 41 and 41b, respectively, and weights 43a and 43b provided at the other end side of elastic plates 41a and 41b. Elastic plates 41a and 41b can be formed by, for example, bending one strip of an elastic plates at right angles with the bending point as the supporting point P.

By such a structure, a plurality of acceleration sensors can be provided at low cost in comparison to a plurality of acceleration sensors arranged individually in the plurality of virtual axis directions respectively. FIG. 6 shows an example where two accelerations sensors are employed. When three or more accelerations sensors are employed, i.e. when the acceleration is to be detected in three or more directions of axis, a corresponding number of elastic plates are to be provided radially from supporting point P.

(3) Third Embodiment

Figure 7:
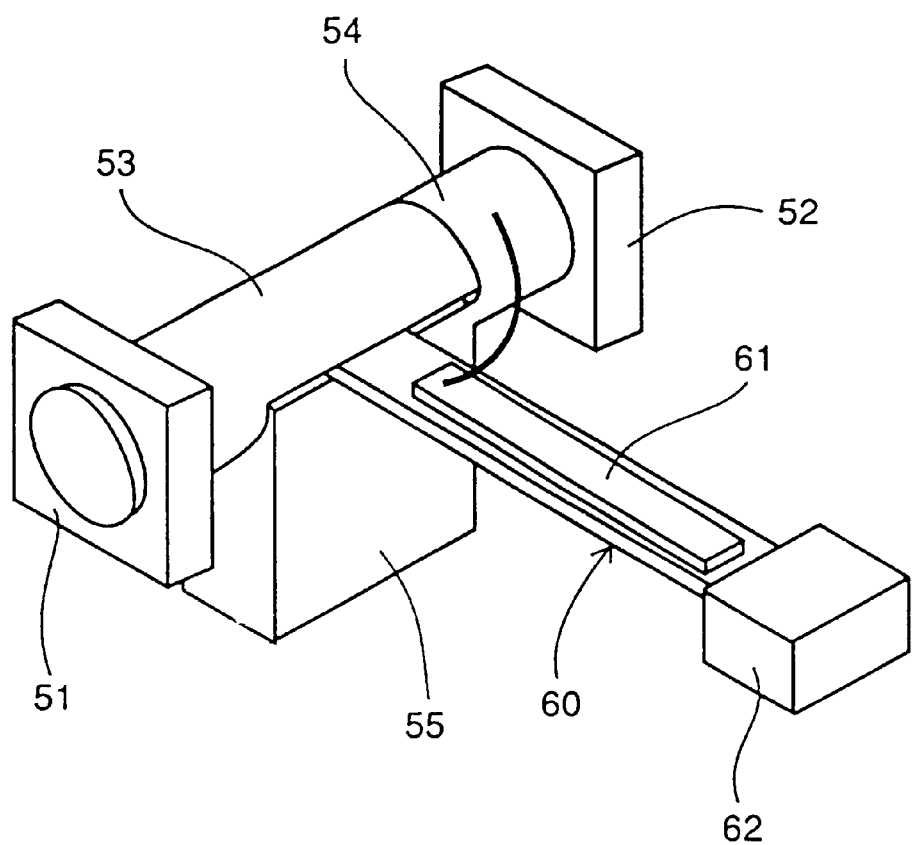
FIG. 7 is a perspective view of the appearance of an acceleration sensor in a pedometer according to a third embodiment of the present invention.
Figure 8:
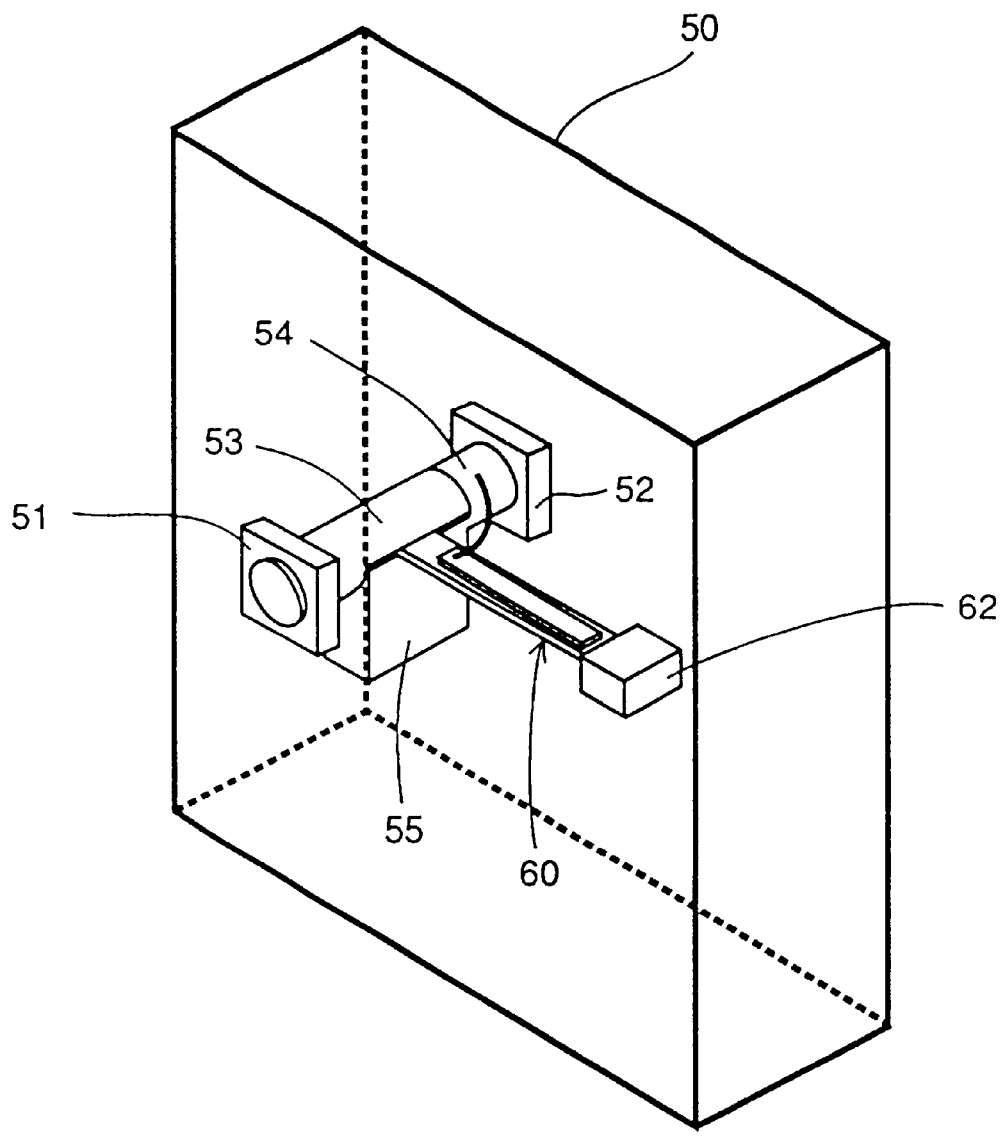
FIG. 8 is a diagram showing the acceleration sensor of FIG. 7 incorporated into the main body of a pedometer.

A structure of an acceleration sensor employed in the pedometer of the third embodiment and attachment to the main body of the pedometer will be described hereinafter with reference to FIGS. 7 and 8. In the present embodiment, bearings 51 and 52 are fixed at opposite walls of a main body 50 of a pedometer. A shaft (+pole) 53 and a shaft (pole) 54 are supported at bearings 51 and 52. An acceleration sensor 60 is provided protruding in the direction perpendicular to the axis direction of shafts 53 and 54. It is to be noted that acceleration sensor 60 is electrically insulated from the—polar shaft 54. Acceleration sensor 60 includes a strain gauge 61. Weight 62 is attached at the leading end. Shafts 53 and 54 become the supporting portion of acceleration sensor 60. Weight 55 heavier than weight 62 is attached to the—polar shaft 54.

Accordingly, acceleration sensor 60 can freely rotate 360° with shafts 53 and 54 as the fulcrum. Since weight 55 is always located in the vertical direction (downwards) regardless of which direction main body 50 is oriented, acceleration sensor 60 maintains a horizontal cantilever state always parallel to the ground. In this embodiment, only one acceleration sensor is necessary since acceleration sensor 60 is rotatable 360 degrees. The angle detection sensor employed in the pedometer of the first and second embodiments is not required.

The functioning state of the angle detection sensor in the pedometer of the first embodiment will be described hereinafter with reference to FIG. 9. The angle detection sensor shown in FIG. 9 includes four conductive pins ①–④ arranged at equal distance from the center point, and a conductive ring 70 located outer and around pins ①–④, and disposed rotatably as to form contact with the pins. Among the four pins of ①–④, pins ① and ④ and pins ② and ③ are respectively connected electrically. Pins ①–④ are fixed in a protruding manner from the substrate in the main body of the pedometer.

Figure 9:
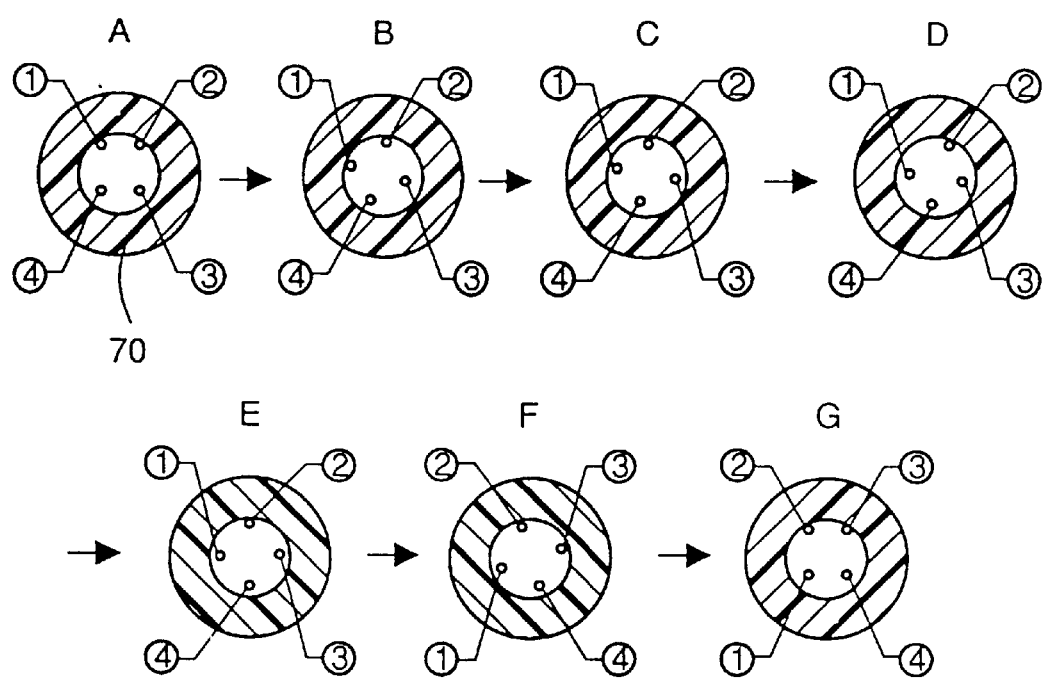
FIG. 9 is a diagram for describing the configuration and function of the angle detection sensor in the pedometer according to the first embodiment.

As the main body of the pedometer rotates counterclockwise, the four pins ①–④ rotate simultaneously as shown in FIG. 9. In the states of A and B in FIG. 9, ring 70 is brought into contact with pins ① and ②. Since all the four pins ①–④ are electrically connected, identification can be made that the main body faces the proximity of the horizontal direction. In the states of C, D and E in FIG. 9, ring 70 is in contact only with pin ②. In the states of F and G, ring 70 forms contact with pins ② and ③. Since pins ① and ④ and pins ② and ③ are not electrically connected, determination can be made that the main body faces the proximity of the vertical direction. Thus, detection can be made whether the main body is tilted in the proximity of the horizontal direction or the vertical direction. The same applies to the case where the main body is rotated clockwise.

In FIG. 2, a signal indicating the inclining state of the main body of the pedometer is applied to MPU 16 by angle detection sensor 5 configured as in FIG. 9. For example, if determination is made at MPU 16 that the pedometer main body is inclined in the horizontal direction, current is supplied from the output port of MPU 16 to the power source of analog amplifier circuit 11 and comparator 12 associated with acceleration sensor 3 of the horizontal direction. In this case, no current is supplied to the power source of analog amplifier circuit 14 and comparator 15 corresponding to acceleration sensor 4 of the vertical direction. In contrast, when determination is made by MPU 16 that the pedometer main body inclines in the vertical direction, current is supplied from the output port of MPU 16 to the power source of analog amplifier circuit 14 and comparator 15. However, no current is supplied to the power source of analog amplifier circuit 11 and comparator 12. Thus, the power sources of analog circuits 10 and 13 are controlled according to the output of angle detection sensor 5.

When the acceleration sensor to be used is altered in association with the power supply control of analog circuits 10 and 13, i.e. when the analog circuit attains a current input state from a current cut off state, it is desirable to minimize the rising time at the time of power supply to ensure a quick response. For example, when a signal is not input in the circuit shown in FIG. 10, a reference voltage V1 is output at $V_{OUT}$. When power is supplied to the operational amplifier with no diode D, several seconds are required for VOUT to attain the level of V1. This is because the charging time of capacitor C1 is increased since the constant of capacitor C1 and the constant of resistor R2 are increased to raise the amplification factor. Thus, the rising time at power ON is increased.

Figure 10:
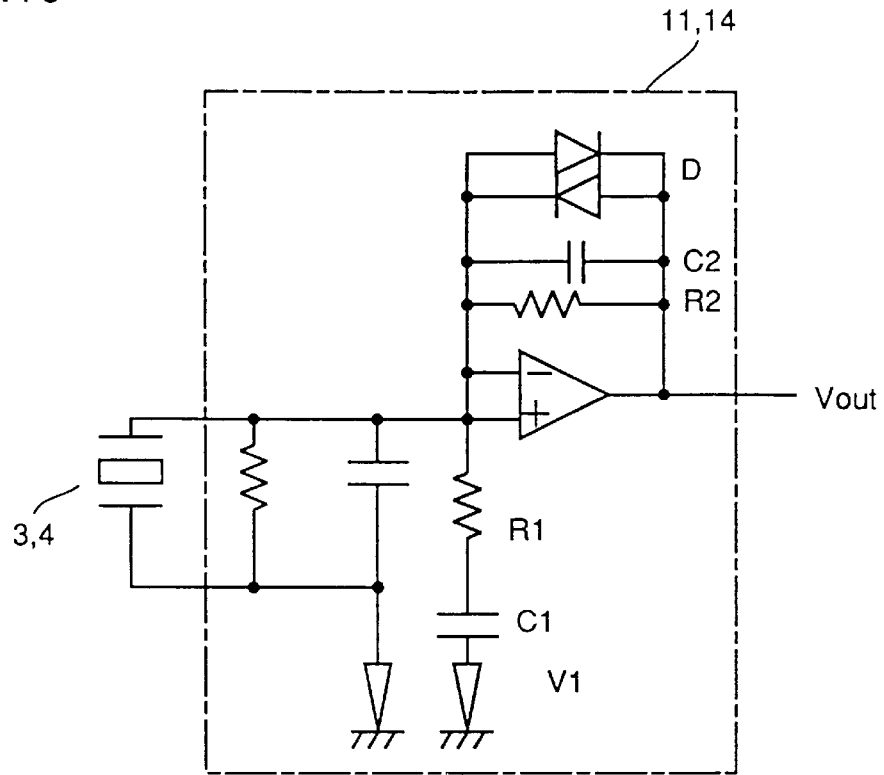
FIG. 10 is a circuit diagram showing an example of an analog circuit related to the angle detection sensor of the pedometer according to the first embodiment.
Figure 11:
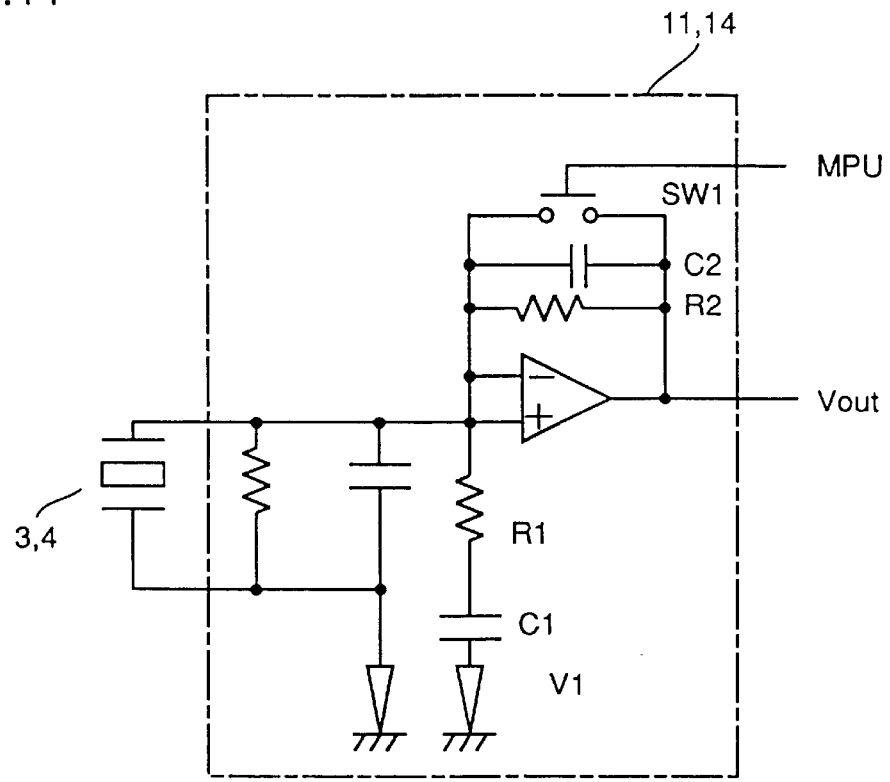
FIG. 11 is a circuit diagram showing another example of an analog circuit related to the angle detection sensor of the pedometer according to the first embodiment.

By arranging diode D as shown in FIG. 10, the charge of capacitor C1 is carried out through diode D, not through resistor R2. As a result, the charging time is shortened, whereby the rising time at power ON becomes ½ or less. An analog switch SW1 controlled by the MPU as shown in FIG. 11 can be arranged instead of diode D. In this case, analog switch SW1 is turned on for a predetermined time after power is supplied to the amplifier circuit. According to the effect as described above, the charging time is shortened to reduce the rising time when power is supplied.

Figure 12:
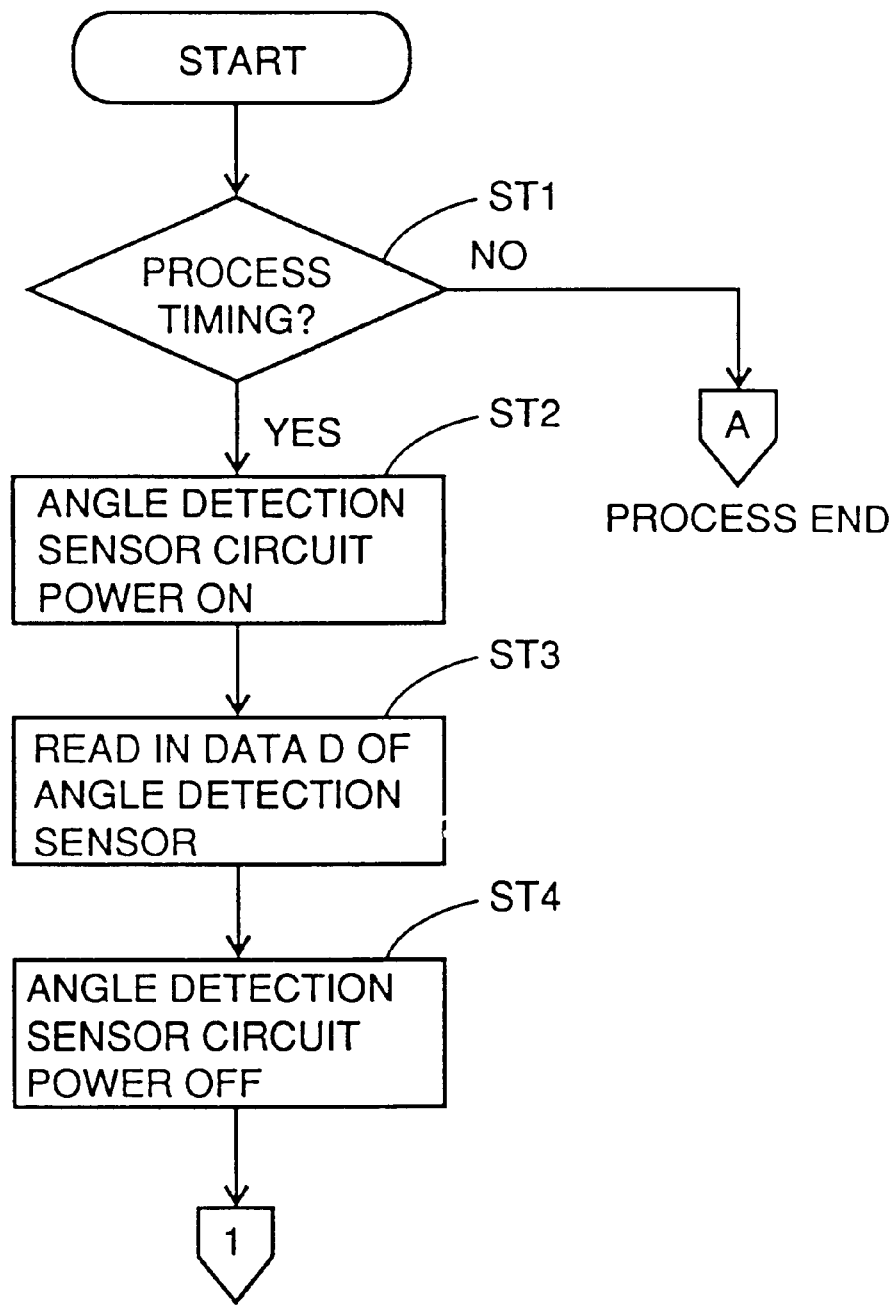
FIGS. 12 and 13 are flow charts showing an example of the angle detection process operation of the pedometer according to the first embodiment.
Figure 13:
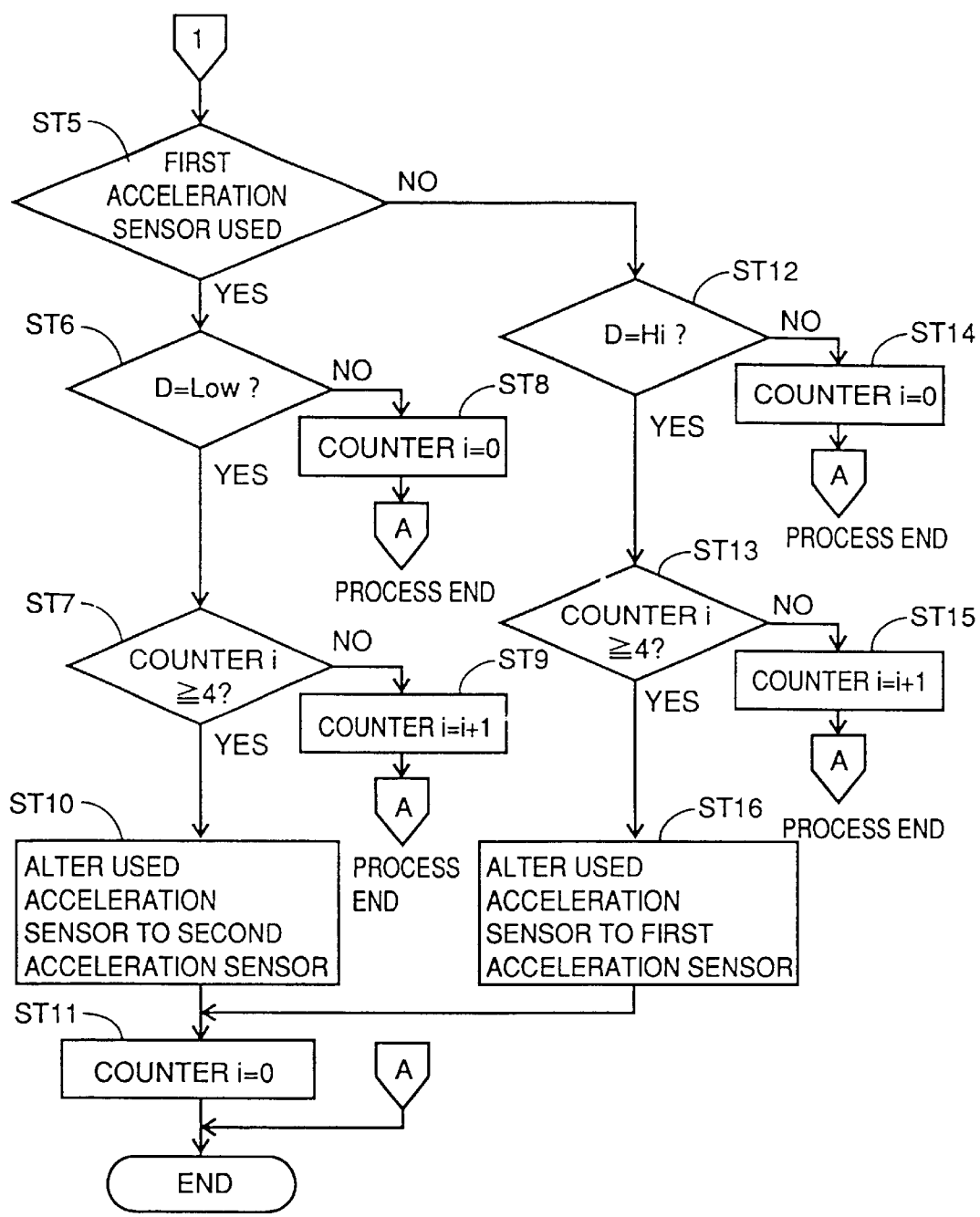
Figure 14:
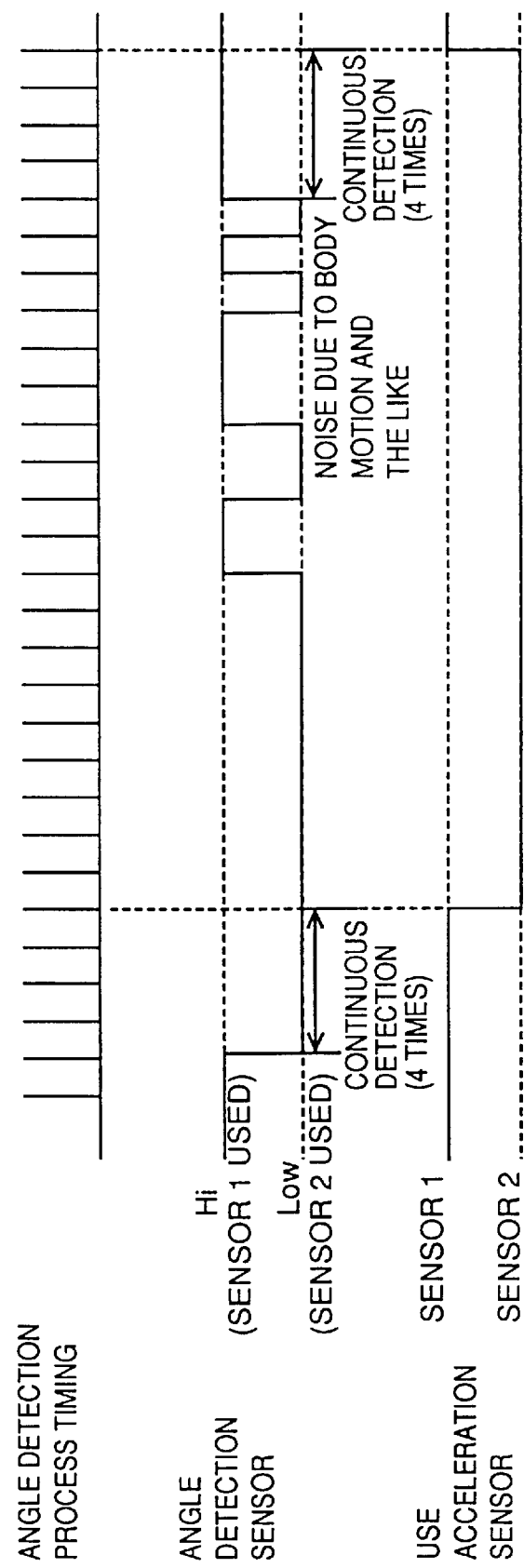
FIG. 14 is a timing chart of the angle detection process of the pedometer according to the first embodiment.

The operation of the angle detection process of the pedometer according to the first embodiment will be described hereinafter with reference to FIGS. 12–14. Prior to counting the number of paces, pedometer main body 1 is attached to the belt or inserted in a pocket or bag. At step (abbreviated as ST hereinafter) 1, detection is made whether at the process timing or not. If NO, the process is terminated. If YES, the circuit power of angle detection sensor 5 is turned on (ST2). This process timing is to carry out an angle detection process for every 250 ms (sampling 4 Hz), for example. The output signal of angle detection sensor 5 is applied to MPU 16. MPU 16 reads in that signal as data D (ST3). Then, the circuit power of angle detection sensor 5 is turned off (ST4). Since the power of angle detection sensor 5 is turned on at the process timing and then turned off after data D is extracted, power consumption can be reduced, and the life time of the power source can be increased.

At ST5, determination is made whether first acceleration sensor 3 is used or not. If it is used, determination is made whether the read in data D is Low (ST6). If YES, determination is made whether counter i≧4 (ST7). If this is YES, the acceleration sensor to be used is altered to second acceleration sensor 4 (ST10). The counter is initialized to i=0 (ST11), and the process ends. More specifically, the output signal of the inclination angle of the main body detected for every predetermined cycle by angle detection sensor 5 varies. The varied output signal is continuous for a preset time of cycles (four times here), so that the accelerated sensor to be used is changed. When NO at ST6, the counter is set to i=0 (ST8). When NO at ST7, the counter is set to i=i+1 (ST9). Then, respective processes end.

When NO at ST5, determination is made whether data D is Hi or not (ST12). If YES, determination is made whether counter i≧4 (ST13). If this is also YES, the employed acceleration sensor is altered to first acceleration sensor 3 for the above described reasons (ST16). The counter is set to i=0 (ST11), and the process ends. When NO at ST12, the counter is set to i=0 (ST14). When NO at ST13, the counter is set to i=i+1 (ST15). Respective processes end.

It is appreciated from the above flow chart that determination is made by MPU 16 of which acceleration sensor in the horizontal direction or the vertical direction the output signal is to be selected from according to data D from angle detection sensor 5. The number of paces is counted according to the output signal from the selected acceleration sensor. When an angle change is detected continuously for a predetermined time (4 times) by angle detection sensor 5, the signal (noise) of the angle detection sensor caused by movement of the body during walking or the like is canceled since the acceleration sensor used is altered. This prevents erroneous detection of angle detection sensor 5 (refer to FIG. 14).

Another embodiment of an angle detection sensor used in the above pedometer will be described hereinafter.

(4) Fourth Embodiment

Referring to FIGS. 15a–15d, FIG. 16a and FIG. 16b, an angle detection sensor 51 according to the present embodiment includes a case 52, a ball 53 which is a mobile unit, an infrared light emitting diode 54 and an infrared-phototransistor 55 forming an optical sensor, and a hollow portion 56 which is the range of movement of the mobile unit.

A sphere ball 53 is accommodated in a movable manner in hollow portion 56 of substantially a cuboid provided substantially at the center of case 52. Ball 53 moves within hollow portion 56 enclosed by the walls of inner side surfaces 56a, 56b, 56c, 56d, an upper surface 56e and a lower surface 56f. Since the distance between upper and lower surfaces 56e and 56f is set slightly greater than the diameter of ball 53, ball 53 mainly moves among inner side surfaces 56a, 56b, 56c and 56d.

Case 52 is molded of a synthetic resin, and ball 53 is formed of an elastic material such as rubber. By forming the components with such materials, the detection accuracy is not affected even when used in a place where magnetism is present. However, the materials are not limited to such referred materials. Inner side surfaces 56a, 56b, 56c and 56d of case 52 do not have to be planer, and a groove corresponding to the curve of ball 53 can be formed in the longitudinal direction. The mobile unit is not limited to a sphere such as ball 53, and may be a cylinder or column and the like. The cross section is not limited to a circle, and may be an ellipse.

Openings 57 and 58 are provided at the two opposite sides of hollow portion 56 forming substantially a cuboid. Infrared-emitting diode 54 and infrared phototransistor 55 are accommodated facing each other in recesses 59 and 60, respectively, provided at the outer side of openings 57 and 58. Leads 54a and 54b and leads 55a and 55b are respectively drawn out from infrared-emitting diode 54 and infrared phototransistor 55, respectively. Since ball 53, infrared-emitting diode 54 and infrared phototransistor 55 are sealed within case 52, the detection accuracy will not be degraded by introduction of disturbance light and dust.

l is the optical axis binding light-emitting diode 54 and phototransistor 55, and $m_1$ and $m_2$ are planes orthogonal to optical axis l. In the present embodiment, the angles α and α' of inner side surfaces 56a and 56b to plane $m_1$ and angles β and β' of inner side surfaces 56c and 56d to plane $m_2$ are both set to 45°.

Figure 17:
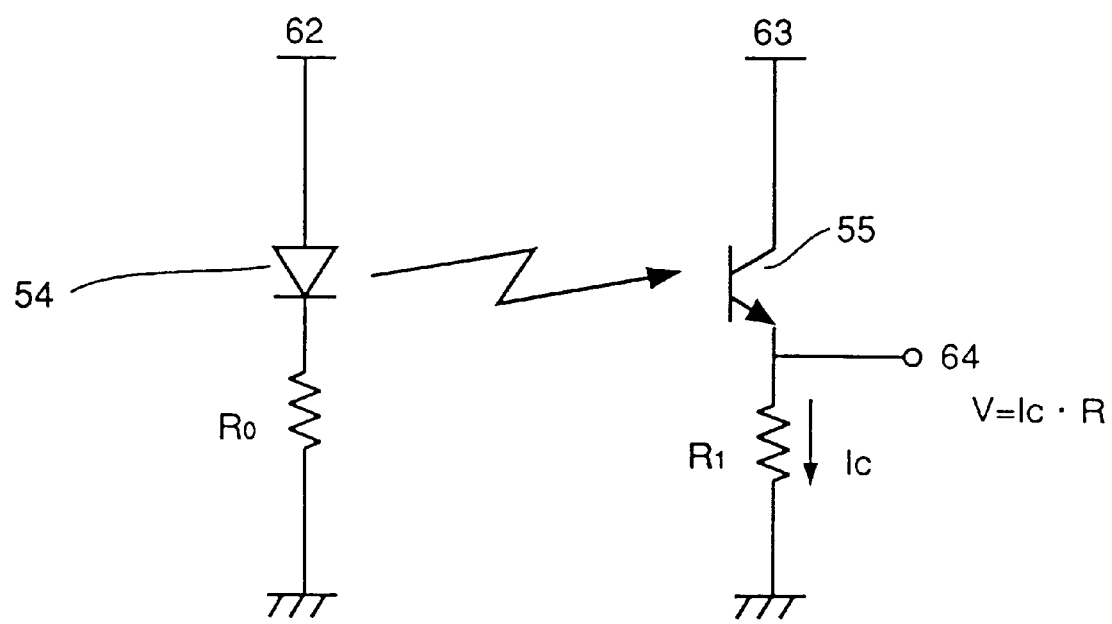
FIG. 17 is a schematic diagram showing the circuit structure of an angle detection sensor.

FIG. 17 shows the circuit configuration of angle detection sensor 51. A resistor $R_0$ for preventing flow of excessive current is connected in series with light-emitting diode 54. A resistor $R_1$ is connected in series at the emitter side of phototransistor 55. By conducting a forward current towards circuit 62, infrared photodiode 54 emits light. The arrival of this light at the light receiving face of the photodetector renders the collector-emitter of infrared-phototransistor 55 conductive to cause a flow of current $I_C$ to circuit 63. A voltage $I_C R_1$ appearing across resistor $R_1$ by current $I_C$ is taken out via an output terminal 64 provided at the emitter side for observation.

The detection principle of angle detection sensor 51 according to the fourth embodiment will be described hereinafter.

Figure 15A:
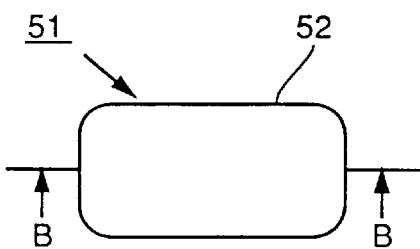
FIGS. 15a–15d are a top view, a front view, a right side view, and a bottom view, respectively, of an angle detection sensor according to a fourth embodiment of the present invention.
Figure 15B:
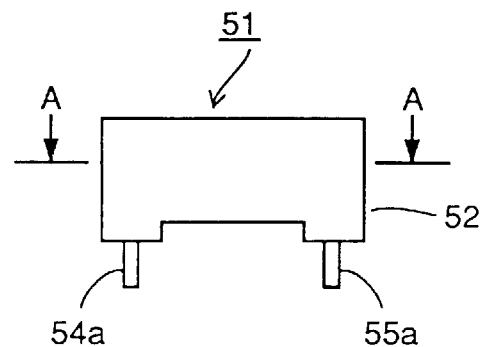
Figure 15C:
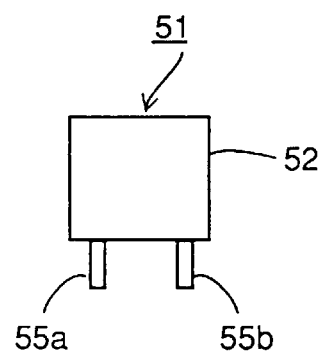
Figure 15D:
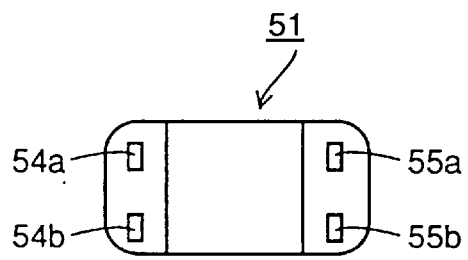
Figure 16A:
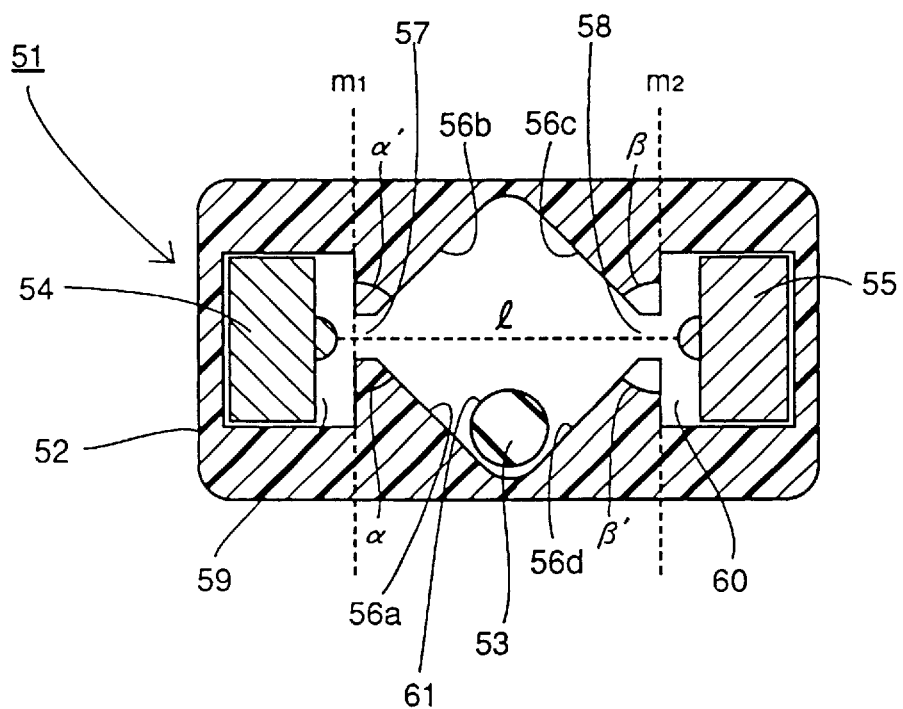
FIGS. 16a and 16b are sectional views of an angle detection sensor taken along lines A—A and B—B, respectively.
Figure 16B:
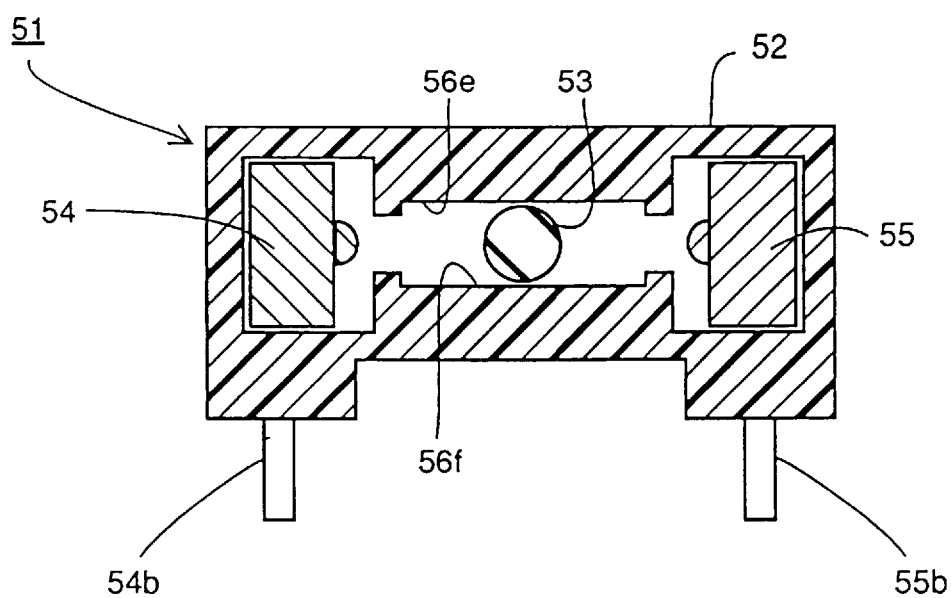

In angle detection sensor 51, the plane parallel to the cross section of B—B shown in FIG. 15b is taken as the detection reference plane. The angle of inclination from the horizontal direction to this plane is detected. Therefore, case 52 is attached to the object of measurement so that the detection reference plane of the object for counting is parallel with the detection reference plane of angle detection sensor 51. Also, the object of counting and the sensor must be maintained so that the detection reference plane is substantially perpendicular.

Figure 18:
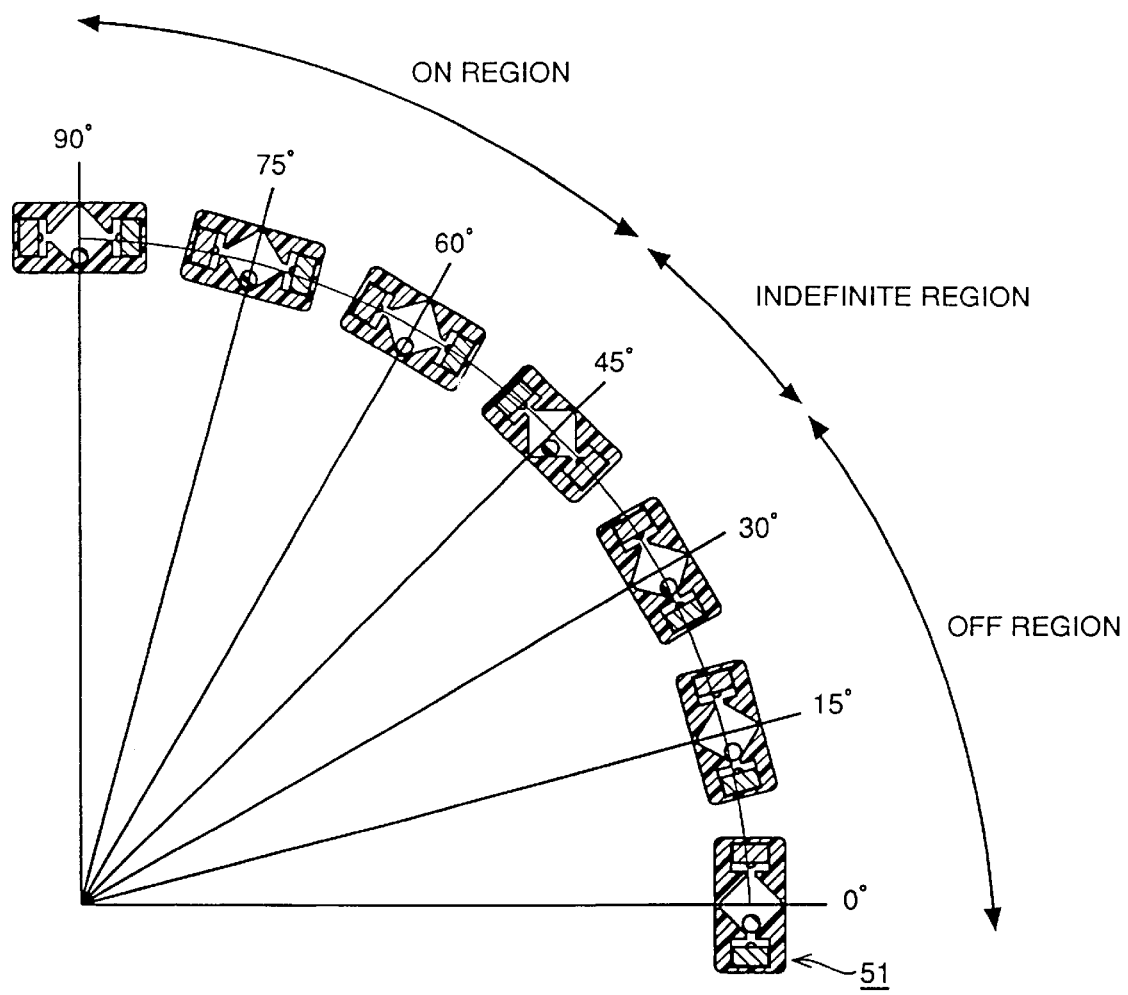
FIG. 18 is a diagram showing the detection principle according to the angle detection sensor.
Figure 19A:
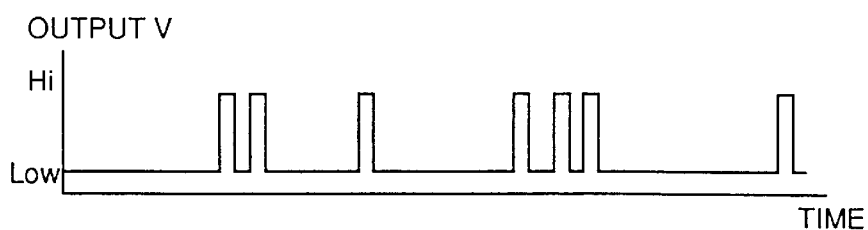
FIGS. 19a–19d are diagrams showing the pulse signal which is a converted version of the output of the photo transistor over time.
Figure 19B:
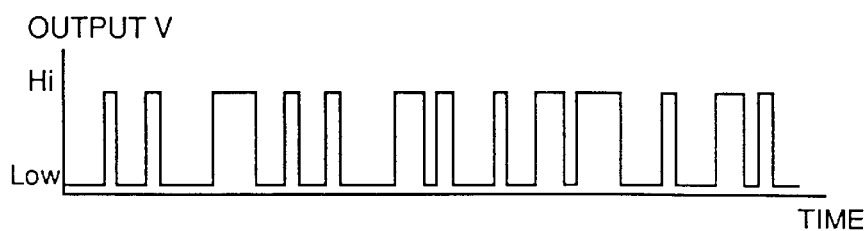
Figure 19C:
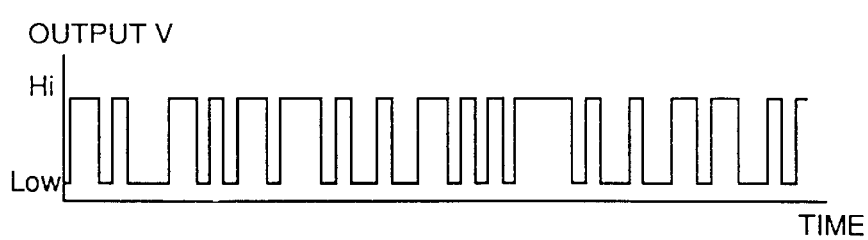
Figure 19D:
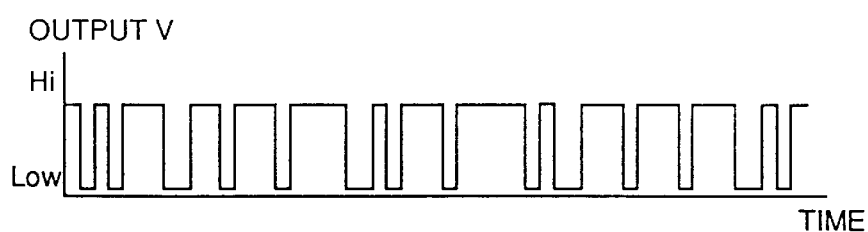

FIG. 18 shows the state of angle detection sensor 51 tilted by a predetermined angle within the detection reference plane by the cross section of B—B. When the angle of inclination is approximately 0–30 degrees, ball 53 is located at opening 58 on the optical axis from light emitting diode 54 to phototransistor 55. The above-described current $I_C$ is not conducted, and there is no output from phototransistor 55. When the angle of inclination is approximately 60–90 degrees, ball 53 is located at a first stopping position 61, not on the optical axis. Therefore, the above-described current $I_C$ is conducted to result in an output from phototransistor 55. When the angle of inclination is in the vicinity of 45 degrees, ball 53 rolls from opening 58 along inner side surface 60d to first stopping position 61 according to the shape of the ball and the contacting conditions with the inner surface of the case. The ball collides with inner side surface 56a to bounce back along inner side surface 56d up to opening 58, and then collides with inner side surface 56c to bounce back again. The ball moves to and fro between inner side surfaces 56a and 56c. Therefore, at the state in the vicinity of an inclination angle of 45 degrees, the ball will cross the optical axis frequently, resulting in an intermittent output from phototransistor 55. The method of estimating the angle when in the vicinity of the inclination angle of 45 degrees will be described hereinafter.

FIGS. 19a–19d show the transition in the pulse signal converted by a comparator so that the signal attains an Hi level when output is generated from phototransistor 55 and a Low level when no output is generated from phototransistor 55. As shown in FIGS. 19a–19d, the frequency of occurrence of an Hi level signal within a predetermined time period differs according to the inclination angle. By registering the frequency of occurrence of a Hi level signal within a predetermined time period with respect to a predetermined inclination angle, the inclination angle can be estimated by comparing with the output of phototransistor 55.

Figure 20:
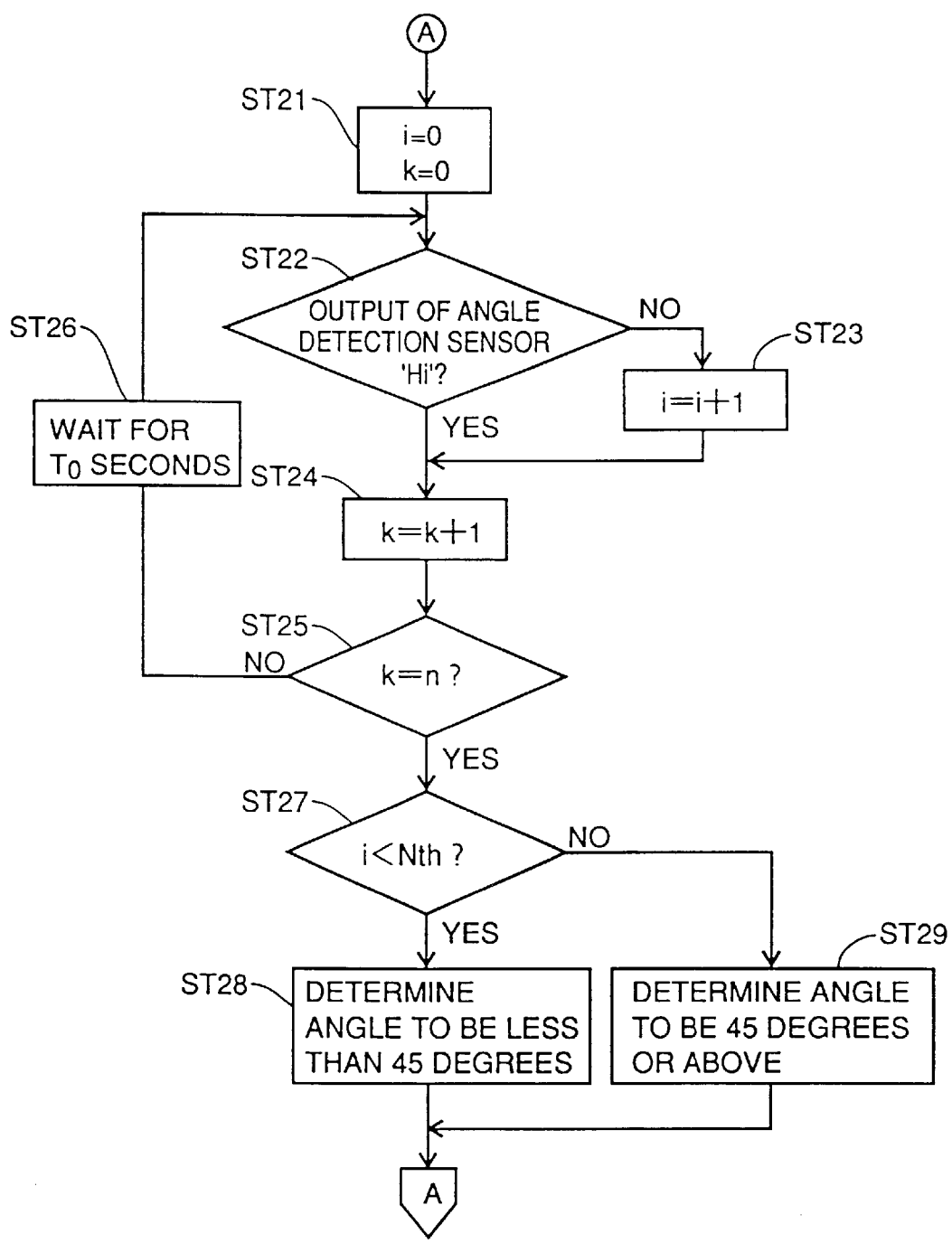
FIG. 20 is a flow chart showing the angle estimation method according to the angle detection sensor.

The method of estimating the angle according to the angle detection sensor of the present embodiment is shown in FIG. 20. At ST21, i=0 and k=0 are set. At ST22, determination is made whether the output of angle detection sensor 55 attains an H level or not. When the level is Hi, control proceeds to ST24 where k=k+1 is set. When the level is not Hi, the control proceeds to ST23. After setting i=i+1, control proceeds to ST24. The control proceeds from ST24 to ST25 where determination is made whether k=N. When k is not N, waiting is conducted for $T_0$ at ST26 to return to ST22. When k=N, control proceeds to ST27 where determination is made whether i<$N_{th}$ or not. When i<$N_{th}$ at ST27, determination is made that the angle is less than 45 degrees. When i is not smaller than $N_{th}$, determination is made that the angle is at least 45 degrees. Control returns to A.

In the present embodiment, i is the pulse of a constant time period, and Nth is a value set corresponding to 45 degrees as described above. Furthermore, $T_0$ is 250 msec, and sampling is carried out for 4 seconds in the present embodiment. Although the number of pulses within a constant time period is counted in the flow chart, the angle can be detected similarly by counting the time of occurrence of a Hi level or Low level within a constant time period.

Figure 21:
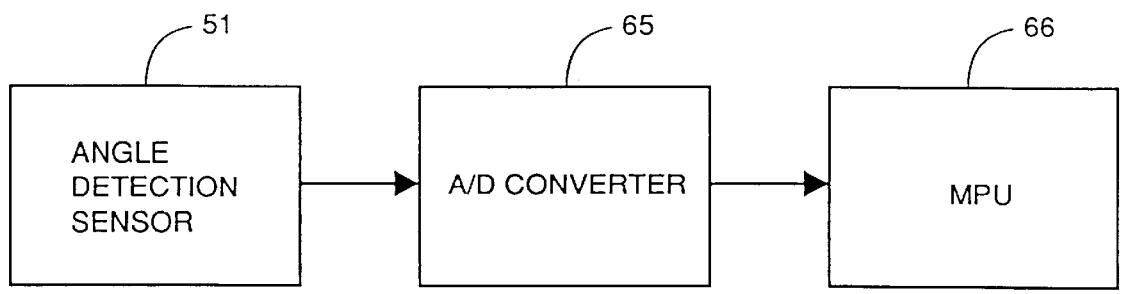
FIG. 21 is a block diagram showing a structure of an angle detection apparatus.

FIG. 21 is a block diagram showing a structure of an angle detection apparatus including the angle detection sensor carrying out the above-described process. Angle detection sensor 51 generates an electric signal corresponding to an angle. An A/D converter 65 converts that signal into a digital signal of at least 1 bit. A MPU (Micro Processing Unit) carries out a calculation process according to the digital signal to estimate and determine the angle.

Detection of whether the inclination angle of the main body of the angle detection sensor is smaller than 45 degrees or 45 degrees and above can be made accurately in the case where the object of counting to which the angle detection sensor of the present invention is attached is stationary or when ball 53 mainly rolls moderately along the inner side surface. In a case where the object of counting rolls in a constant direction, the number of rotations can be detected since ball 53 repeats the above-described movement in hollow portion 56.

Although angles α, α' of inner side surfaces 56a and 56b to plane $m_1$ and angles β, β' of inner side surface 56c and 56d to plane $m_2$ are both set to 45 degrees in the present embodiment, determination can be made according to the procedure shown in FIG. 20 whether the angle is below or above a desired angle other than 45 degrees by altering these set values.

In the present embodiment, α=α' and β=β'. However, α≠α' and β≠β' can be set such that the angle of inner side surface 56a to plane $m_1$ differs from the angle of inner side surface 56b to plane $m_1$, and the angle of inner side surface 56c to plane $m_2$ differs from the angle of inner side surface 56d to plane $m_2$. However, it is to be noted that, in order to similarly detect the angle when the angle detection sensor is rotated 180 degrees in a predetermined direction, the inner side surfaces facing each other must be formed in parallel, i.e., α=β and α'=β'. Therefore, the configuration of the hollow portion is not limited to the cuboid as in the present invention, and the cross section parallel to the detection reference plane can be a parallelogram such as a rhombus or a rectangle.

(5) Fifth Embodiment

In the fourth embodiment, angle detection in a static state or a moderately rotated state was described. In the fifth embodiment, angle detection in the case where motion is associated such as of a pedestrian will be described. The structure of the angle detection sensor and the angle detection apparatus per se is similar to that of the fourth embodiment. Likewise reference characters are allotted, and detailed description thereof will not be repeated.

In a circumstance where the aforementioned motion is associated, ball 53 repeatedly comes into collision with inner side surfaces 56a, 56b, 56c and 56d to constantly move within hollow portion 56 irrespective of the inclination angle of the main body of angle detection sensor 51. In response to this motion, the output of phototransistor 55 is provided intermittently independent of the inclination angle of the main body of angle detection sensor 51.

Considering the motion state of ball 53, the relative angle formed by the gravity acting on ball 53 and inner side surfaces 56a, 56b, 56c and 56d which are the binding conditions of motion is determined by the inclination angle of the main body of angle detection sensor 51 even if the motion of the main body of angle detection sensor 51 is not constant. More specifically, the motion state of ball 53 is governed by the inclination angle of the main body of angle detection sensor 51.

According to a principle similar to that of the angle detection in the vicinity of 45 degrees in the fourth embodiment, the angle can be estimated and determined by the frequency of occurrence of a Hi level signal output from phototransistor 55 within a predetermined time. By setting Nth in the flow chart of FIG. 20 with respect to each angle, detection of any angle in addition to the angles in the vicinity of 45 degrees, can be detected by a similar procedure.

(6) Other Embodiments

Another embodiment of the present invention will be described hereinafter. Components similar to those of the fourth and fifth embodiments have the same reference characters allotted, and detailed description thereof will not be repeated. Only elements that differ will be described.

In the fourth and fifth embodiments, an optical sensor formed of a light emitting diode 54 and a phototransistor 55 is used as the presence detection means. However, detection using electromagnetic wave, acoustic wave, ultrasonic wave and the like can be made as long as the presence of a mobile unit in a predetermined region can be detected. An infrared light emitting laser can be used instead of infrared photodiode 54. Also, an infrared photodiode can be used instead of infrared phototransistor 55.

In the fourth and fifth embodiments, the range of movement of ball 53 is a cavity of substantially a cuboid. The ball is unlikely to move between upper and lower surfaces 56e and 56f, and shows motion in a two dimensional manner. However, the ball is not limited to this manner, and can be made to move in a three dimensional manner by forming the cavity in axial symmetry about the optical axis of the optical sensor. By this implementation, all the planes including the optical axis can be set as the detection reference plane. It is to be noted that the cavity is not limited to one that is in axial symmetry to the optical axis.

In the fourth and fifth embodiments, the range of movement of ball 53 which is a mobile unit is within a cavity regulated by inner side surfaces 56a, 56b 56c and 56d, and upper and lower surfaces 56e and 56f in case 52. However, the element regulating the range of movement of the mobile unit is not limited to this, and can be supported by a resilient body such as a spring. The present embodiment is directed to change in the motion state of the mobile unit in the range of movement in response to inclination of the angle detection sensor main body. The varying state of motion is obtained as the time of or frequency of occurrence of the mobile unit in a predetermined region within the range of movement in a constant time period. The angle is detected according to the obtained value. As a result, the angle can be detected if the range of movement of the mobile unit is regulated so that the state of motion of the mobile unit varies within the range of movement according to inclination of the angle detection sensor main body.

(7) Activity Monitor and Calorimeter

An activity monitor and a calorimeter adapting the principle of the above pedometer will be described hereinafter. The appearance and circuit block view of the activity monitor and calorimeter are identical to those of the pedometer shown in the above embodiment. The operation software and display data differ.

Figure 22:
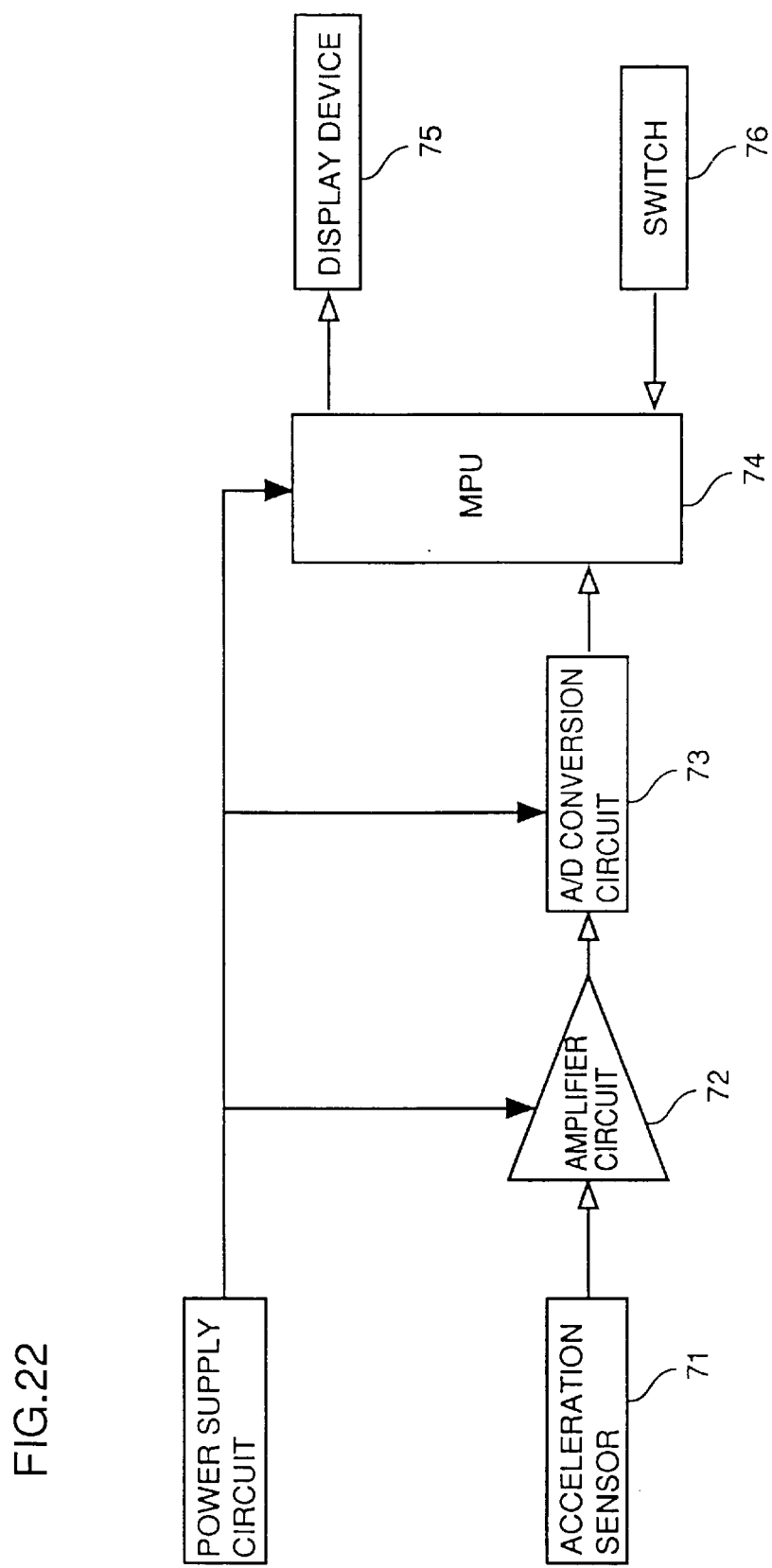
FIG. 22 is a block diagram showing main components of an activity monitor and a calorimeter.

FIG. 22 is a block diagram showing the main components of an activity monitor and calorimeter. This diagram is similar to FIG. 2. Referring to FIG. 22, an activity monitor or a calorimeter includes an acceleration sensor 71 attached to the human body for detecting motion of the body, an amplifier circuit 72 for amplifying a signal detected by acceleration sensor 71, an A/D conversion circuit 73 for converting the amplified signal into a digital signal, a MPU 74 having a predetermined function that will be described afterwards, a display device 75, a switch 76, and a power supply circuit 77 for supplying power to each circuit. MPU 74 includes the function of calculating the quantity of motion according to an input digital signal, a remaining target calorie calculation function for calculating the remaining target calorie using the estimated calorie consumption of a predetermined time period, for example (1 day), a target quantity of motion calculation function for calculating a target quantity of motion desirable for the human body to consume in a predetermined time (1 day), and a life activity index calculation function for calculating the life activity index. The sex, age, quantity of motion, life activity level and the like are indicated on display device 75. Switch 76 includes a switch for turning on/off the power, a select switch for selecting the type of display, and a switch for entering the sex, age, and the like.

In this quantity of motion gauge apparatus, the exercise, life activity level, and the like are calculated by each calculation function. This calculation requires the basal metabolism, which can be obtained by various ways. One way is to use the following equation (1). More specifically, the basal metabolism B is obtained by:

$$B = Bs \times S \quad (1)$$

Bs: basal metabolic standard value per 1 m² in body surface area (kcal/m²/time)

S: body surface area (m²)=(body weight·kg)$^{0.444}$×(height·cm)$^{0.663}$× .008883

It is to be noted that this equation (1) applies to an individual of six years or older, and the value of Bs differs depending upon the sex and age. The value can be obtained from "Nutritional Requirement of Japanese (fifth revision)", for example.

The life activity index can be calculated as follows. The total energetic metabolism A for one day is represented by the following equation (2) with the energy B·χ consumed by exercise and the like, basal metabolism B, and the metabolism by specific dynamic action (0.1·A; the energy required to digest * absorb ingested food) (χ is life activity index).

$$A = B \cdot \chi + B + (1/10)A \quad (2)$$

A modification of this equation results in:

$$\chi = [(9/10) \times (A/B)] - 1 \quad (3)$$

The life activity index χ can be obtained by substituting basal metabolism B obtained by calculation from the sex-age-height-weight and the total energy metabolism A calculated by the MPU using basal metabolism B and the degree of exercise obtained from the signal waveform of the acceleration sensor into the above equation (3).

The level of exercise can be identified by dividing the calculated life activity index χ into 4 stages, for example, according to the level of life activity.

The target quantity of motion is calculated with the above life activity index χ as the target. In this case, life activity index χ is set to an appropriate value of 0.5, and the above equation (2) is used. More specifically, since target quantity of motion A is:

$$A = B \cdot \chi + B + (1/10)A$$

the following is obtained:

$$A = (10/9) \cdot (1 + \chi) \cdot B$$

With χ=0.5, the target quantity of motion A can be calculated by:

$$A = 1.67 \times B \quad (4)$$

Figure 23:
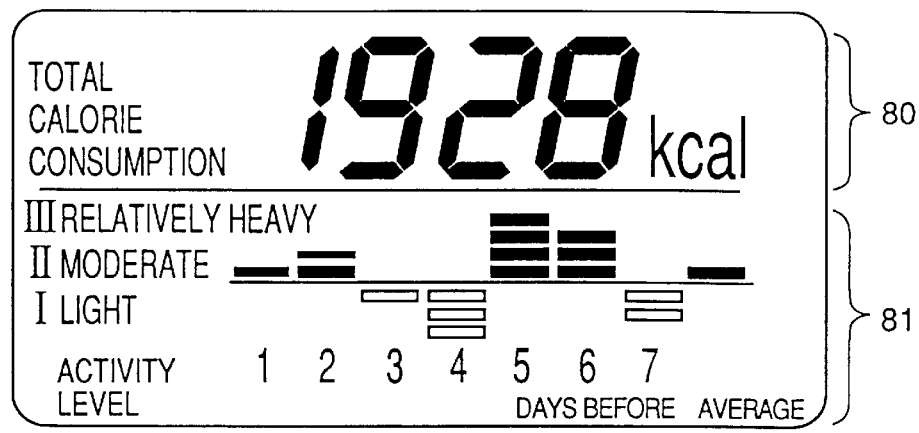
FIG. 23 shows an example of a display screen of an activity monitor and calorimeter.

The display format of the display screen of display device 5 will be described hereinafter. FIG. 23 shows an example of a display screen. Referring to FIG. 23, the display screen is divided into an upper section 80 and a lower section 81. The quantity of motion (total calorie consumption, cal) is displayed in numerics in upper section 80. The life activity level of the last one week and the average of one week is displayed in the format of a bar graph in lower section 81. The activity level is divided into three stages of I (light), II (moderate), III (relatively heavy). II (moderate) is set as the target level. In this display format, the life activity amount (total calorie consumption) and the activity level at the end of the day are calculated and automatically displayed. Also, the calorie consumption of each day for the last 1 week (7 days), the average calorie consumption of 7 days, and the average activity level are displayed. An automatic memory function, for example, should be provided to record the calorie consumption and the activity level of one week. By such a display format, the tendency of physical exercise of the one last week can be identified at a glance.

Figure 24:
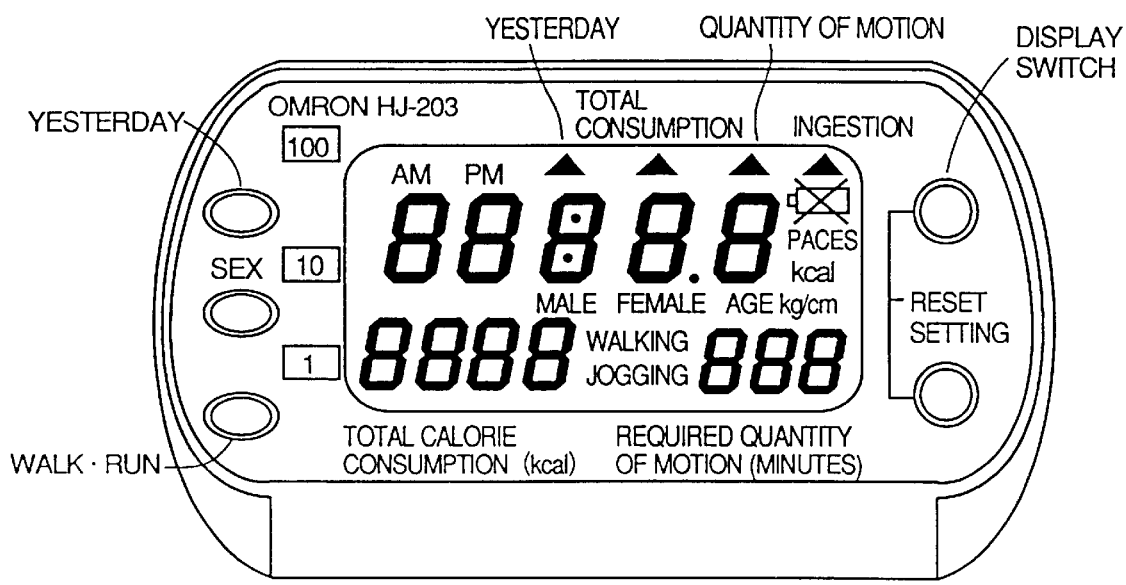
FIG. 24 shows another example of a display screen of an activity monitor and calorimeter.

Another display format is shown in FIG. 24. In this display format, the target calorie consumption is automatically set and displayed corresponding to each individual upon entering the sex, age, height, and weight. The rate of achievement of that target calorie consumption is displayed by a bar graph and picture.

An activity monitor displays only the lower section of FIG. 23, and a calorimeter displays only the upper section of FIG. 23.

Industrial Field of Application

As described above, the pedometer of the present invention does not have to be limited to application to the belt around the waist. Fluctuation can be detected using a sensor according to the orientation of the main body of the pedometer even when placed in the pocket of a dress or pants, or inside a bag. The number of paces can be counted in an arbitrary state.

What is claimed is:

1. A pedometer comprising:
    a plurality of sensors disposed within a main body so that their attached directions differ from each other, and providing an output signal according to a fluctuation component in an up and down direction,
    angle detection means provided within said main body for detecting orientation of said main body,
    selection means for selecting one of output signals from said plurality of sensors according to a detection signal of said angle detection means, and
    pace counter means for counting the number of paces from the output signal of the sensor selected according to selection of said selection means.

2. The pedometer according to claim 1, wherein said pace counter means comprises an analog circuit,
    wherein power of said analog circuit amplifying an output signal of said acceleration sensor is controlled according to an output signal of said angle detection sensor.

3. The pedometer according to claim 2, wherein said analog circuit includes a feedback circuit portion, said feedback surface including a diode.

4. The pedometer according to claim 2, wherein said analog circuit comprises a feedback circuit portion, said feedback surface portion including an analog switch.

5. The pedometer according to claim 1, wherein said angle detection means comprises a plurality of conductive pins, and a conductive ring surrounding said plurality of pins.

6. The pedometer according to claim 1, wherein said plurality of sensors are two acceleration sensors arranged in a main body and supported in a cantilever manner so as to be perpendicular to each other, and selection means for providing an output of a greater fluctuation out of said two acceleration sensors.

7. The pedometer according to claim 1, wherein said plurality of sensors are two acceleration sensors arranged in a main body and supported in a cantilever manner so as to be perpendicular to each other,
    an angle detection sensor provided in said main body for detecting orientation of said main body,
    selection means for providing an output of a greater fluctuation of said two acceleration sensors according to an output of said angle detection sensor, and
    calculation means for calculating calorie consumption according to an output of said select means.

8. A pedometer comprising:
    a plurality of acceleration sensors disposed within a main body so that their attached direction differ from each other, and producing an electric signal according to a fluctuation component in an up and down direction,
    angle detection means provided in said main body for detecting orientation of said main body,
    selection means for selecting one of output signals from said plurality of acceleration sensors according to a detection signal of said angle detection means, and
    pace counter means for counting the number of paces from an output signal of the acceleration sensor selected according to selection of said selection means.

9. The pedometer according to claim 8, wherein said plurality of acceleration sensors respectively comprise a lever supported in a cantilever manner, and a piezoelectric element attached to said lever, said lever including two acceleration sensors disposed to be oriented in a direction at right angles with each other.

10. The pedometer according to claim 8, wherein said acceleration sensor includes a weight, a piezo-electric element, a weight case attached to one end side of said piezo-electric element, and a supporting member attached to another end side of said piezo-electric element.

11. The pedometer according to claim 8, wherein an output signal of an inclination angle of the main body detected for every constant period by said angle detection sensor varies, and
    wherein the acceleration sensor used is altered when said varying output signal continues for a preset number of times.

12. A pedometer comprising:
    an acceleration sensor provided at a main body for providing an electric signal according to a fluctuation component in an up and down direction, and
    pace counter means for counting the number of paces according to an output signal of said acceleration sensor,
    wherein said acceleration sensor comprises a lever provided in a rotatable manner around a supporting axis, a piezo-electric element attached to said lever, and a weight for maintaining said lever horizontal attached in proximity of said supporting axis,
    wherein said acceleration sensor provides an output signal by said piezo-electric element independent of orientation of said main body by said lever orientated horizontal independent of orientation of said main body.

13. A pedometer comprising:
    a plurality of sensors disposed to be orientated differing from each other, and providing an electric signal according to a fluctuation component in an up and down direction,
    select means for selecting one of output signal from said plurality of sensors, and
    pace counter means for counting the number of paces according to selection of said select means.

14. The pedometer according to claim 1, wherein said angle detection sensor comprises a predetermined case, light projecting means provided in said case, light receiving means provided in said case opposite said light projecting means, and an object provided between said light projecting means and said light receiving means in said case for interception light from said light projecting means to said light receiving means by having said case inclined by at least a predetermined angle.

* * * * *

UNITED STATES PATENT AND TRADEMARK OFFICE
CERTIFICATE OF CORRECTION

PATENT NO. : 6,254,513 B1
DATED : July 3, 2001
INVENTOR(S) : Masaaki Takenaka et al.

It is certified that error appears in the above-identified patent and that said Letters Patent is hereby corrected as shown below:

<u>Column 13,</u>
Line 40, replace "surface" with -- circuit portion --.
Line 43, replace "surface" with -- circuit --.

<u>Column 14,</u>
Line 63, replace "interception" with -- intercepting --.

Signed and Sealed this

Thirteenth Day of April, 2004

JON W. DUDAS
*Acting Director of the United States Patent and Trademark Office*